US012771413B2

(12) United States Patent
Chou et al.

(10) Patent No.: US 12,771,413 B2
(45) Date of Patent: Oct. 20, 2026

(54) SHORTENED TIME DOMAIN PRECODING FILTERS FOR MULTI-ANTENNA PRECODING

(71) Applicant: QUALCOMM Incorporated, San Diego, CA (US)

(72) Inventors: Tzu-Hsuan Chou, San Diego, CA (US); Jing Jiang, San Diego, CA (US); Jing Sun, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 18/454,058

(22) Filed: Aug. 22, 2023

(65) Prior Publication Data

US 2025/0070830 A1 Feb. 27, 2025

(51) Int. Cl.

*H04L 5/12* (2006.01)
*H04B 7/0456* (2017.01)
(Continued)

(52) U.S. Cl.

CPC ........... *H04B 7/0456* (2013.01); *H04B 7/065* (2013.01); *H04L 5/0098* (2013.01)

(58) Field of Classification Search

CPC .... H04B 7/0456; H04B 7/065; H04B 7/0626; H04B 7/0639; H04B 7/0465; H04B 7/0482; H04L 5/0098; H04L 27/2614
(Continued)

(56) References Cited

U.S. PATENT DOCUMENTS

| | | | | |
|---|---|---|---|---|
| 2015/0382223 A1* | 12/2015 | Ko | ........................ | H04B 7/0626 370/252 |
| 2017/0134201 A1* | 5/2017 | Kim | ...................... | H04B 17/354 |

(Continued)

FOREIGN PATENT DOCUMENTS

| | | |
|---|---|---|
| WO | WO-2020151741 A1 | 7/2020 |
| WO | WO-2022032424 A1 | 2/2022 |

OTHER PUBLICATIONS

Xiaotian Fu et al ("A Tutorial on Downlink Precoder Selection Strategies for 3GPP MIMO Codebooks", IEEE Access, vol. 4, 2016, CNAM CEDRIC/LAETITIA, 292 rue Saint-Martin—75141 Paris Cedex 03, France , pp. 1-26.*

(Continued)

*Primary Examiner* — Helene E Tayong
(74) *Attorney, Agent, or Firm* — Holland & Hart LLP

(57) ABSTRACT

Methods, systems, and devices for wireless communication are described. A user equipment (UE) transmits a signal in accordance with a shortened time domain precoding filter for multi-antenna precoding. In some examples, a UE may precode the signal in accordance with a subset of time domain precoding taps. The UE may select the subset of time domain precoding taps from a set of time domain precoding taps in accordance with an absolute value of each of the set of time domain precoding taps. The UE may transmit the signal in accordance with the precoding. In other examples, the UE may select a transmit channel shortener to apply to a channel. The UE may select the transmit channel shortener based on a channel energy of a shortened channel that is associated with the transmit channel shortener. The UE may transmit the signal via the shortened channel.

29 Claims, 26 Drawing Sheets

(51) Int. Cl.
*H04B 7/06* (2006.01)
*H04L 5/00* (2006.01)

(58) Field of Classification Search
USPC .......................................................... 375/262
See application file for complete search history.

(56) References Cited

U.S. PATENT DOCUMENTS

| | | | | |
|---|---|---|---|---|
| 2020/0220591 | A1* | 7/2020 | Zhang | H04B 7/0456 |
| 2020/0367083 | A1 | 11/2020 | Hao et al. | |
| 2021/0306046 | A1* | 9/2021 | Zhang | H04B 17/24 |
| 2022/0029686 | A1* | 1/2022 | Hao | H04B 7/0456 |
| 2022/0038159 | A1* | 2/2022 | Hao | H04B 7/0626 |

OTHER PUBLICATIONS

Jin H., et al., "Massive MIMO Evolution Towards 3GPP Release 18", arxiv.org, Cornell University Library, 201 Olin Library Cornell University Ithaca, NY 14853, IEEE Journal on Selected Areas in Communications, Oct. 15, 2022, 23 Pages, XP091345090, Sections II.B, IV.C.1.
Partial International Search Report—PCT/US2024/040066—ISA/EPO—Dec. 6, 2024.
International Search Report and Written Opinion—PCT/US2024/040066—ISA/EPO—Feb. 3, 2025.

* cited by examiner

SHORTENED TIME DOMAIN PRECODING FILTERS FOR MULTI-ANTENNA PRECODING

TECHNICAL FIELD

The following relates to wireless communication, including shortened time domain precoding filters for multi-antenna precoding.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communication system may include one or more base stations, each supporting wireless communication for communication devices, which may be known as user equipment (UE).

Wireless communication devices, such as UEs and network entities, may implement orthogonal frequency division multiplexing (OFDM), such as DFT-S-OFDM, to transmit or receive wireless communication, which may enable the wireless communication devices to communicate via relatively large bandwidths (for example, via a wideband). The wireless communication devices may operate in higher frequency bands using such large bandwidths, but the wireless communications between the devices may suffer from relatively high pathloss in the higher frequency bands. To overcome pathloss, the wireless communication devices may implement multiple antenna (multi-antenna) precoding to encode and/or decode the wireless communications. For example, a transmitting wireless communication device may transmit a signal via multiple antennas using the multi-antenna precoding. By implementing the multi-antenna precoding, the transmitting wireless communication device may concentrate a power of the signal in some spatial directions more than others, which may increase a beamforming gain associated with the signal and offset the pathloss. However, the implementation of multi-antenna precoding with OFDM, such as DFT-S-OFDM, may result in a high peak to average power ratio (PAPR), among other challenges.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by a user equipment (UE). The method includes precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The method may further include transmitting the signal in accordance with the precoding via the set of subcarriers.

Another innovative aspect of the subject matter described in this disclosure can be implemented in a UE. The UE may include a processing system that includes processor circuitry and memory circuitry that stores code. The processing system may be configured to cause the UE to precode a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The processing system may be further configured to cause the UE to transmit the signal in accordance with the precoding via the set of subcarriers.

Another innovative aspect of the subject matter described in this disclosure can be implemented in a UE. The UE may include means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The UE may further include means for transmitting the signal in accordance with the precoding via the set of subcarriers.

Another innovative aspect of the subject matter described in this disclosure can be implemented in a non-transitory computer-readable medium storing code for wireless communication. The code may include instructions executable by one or more processors to precode a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The code may further include instructions executable by one or more processors to transmit the signal in accordance with the precoding via the set of subcarriers.

Another innovative aspect of the subject matter described in this disclosure can be implemented in a method for wireless communication by a network entity. The method may include precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The method may further include transmitting the signal via the set of subcarriers in accordance with the precoding.

Another innovative aspect of the subject matter described in this disclosure can be implemented in a network entity. The network entity may include a processing system that includes processor circuitry and memory circuitry that stores code. The processing system may be configured to cause the network entity to precode a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The processing system may be further configured to cause the network entity to transmit the signal via the set of subcarriers in accordance with the precoding.

Another innovative aspect of the subject matter described in this disclosure can be implemented in a network entity. The network entity may include means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The network entity may further include means for transmitting the signal via the set of subcarriers in accordance with the precoding.

Another innovative aspect of the subject matter described in this disclosure can be implemented in a non-transitory computer-readable medium storing code for wireless communication. The code may include instructions executable by one or more processors to precode a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The code may further include instructions executable by one or more processors to transmit the signal via the set of subcarriers in accordance with the precoding.

Another innovative aspect of the subject matter described in this disclosure can be implemented in a method for wireless communication by a transmitter. The method may include selecting, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The method may further include transmitting a signal in accordance with the selected transmit channel shortener via the set of subcarriers of the channel.

Another innovative aspect of the subject matter described in this disclosure can be implemented in a transmitter. The transmitter may include a processing system that includes processor circuitry and memory circuitry that stores code. The processing system may be configured to cause the transmitter to select, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The processing system may be further configured to cause the transmitter to transmit a signal in accordance with the selected transmit channel shortener via the set of subcarriers of the channel.

Another innovative aspect of the subject matter described in this disclosure can be implemented in a transmitter. The transmitter may include means for selecting, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The transmitter may further include means for transmitting a signal in accordance with the selected transmit channel shortener via the set of subcarriers of the channel.

Another innovative aspect of the subject matter described in this disclosure can be implemented in a non-transitory computer-readable medium storing code for wireless communication. The code may include instructions executable by one or more processors to select, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The code may further include instructions executable by one or more processors to transmit a signal in accordance with the selected transmit channel shortener via the set of subcarriers of the channel.

DETAILED DESCRIPTION

Figure 1:
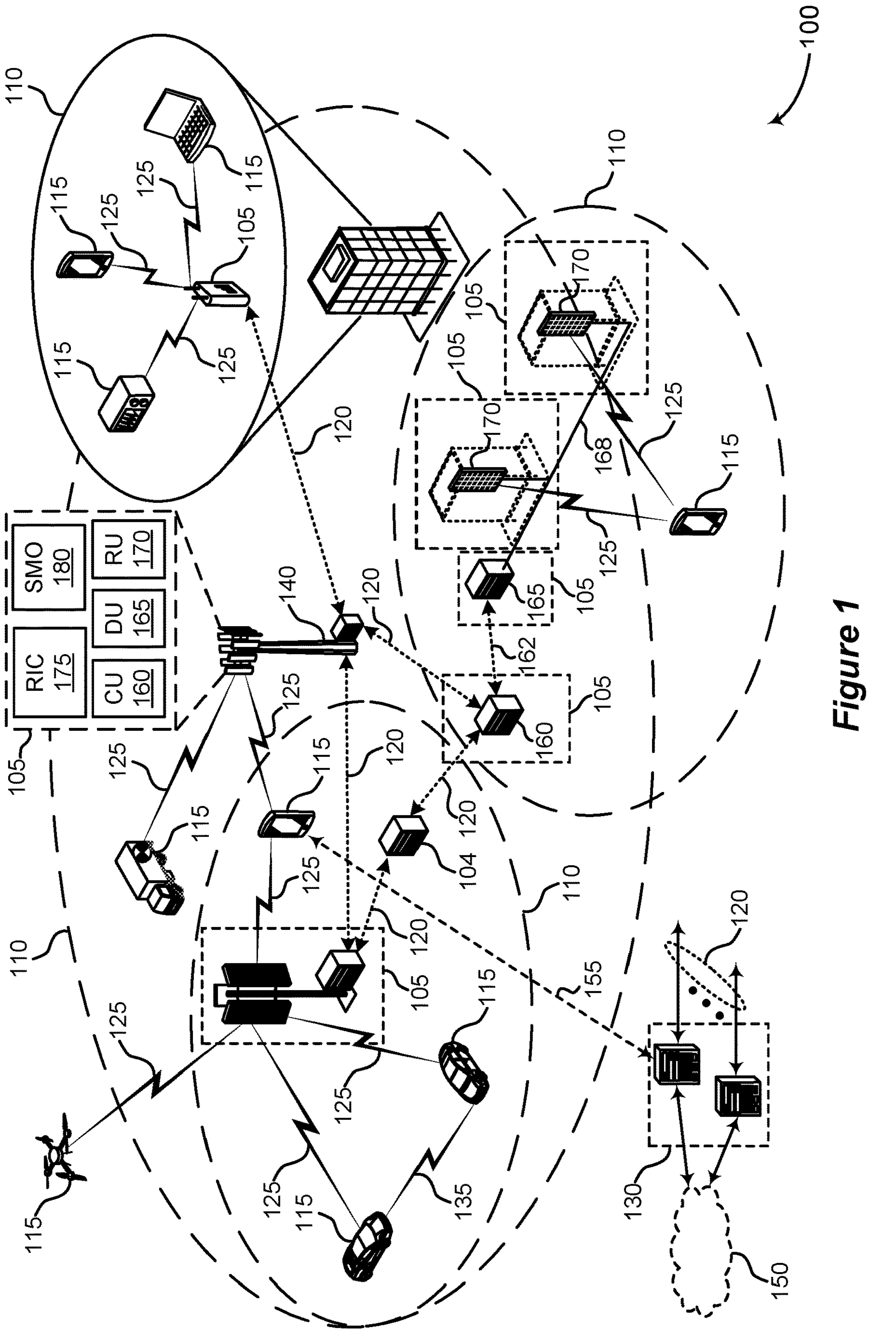
FIG. 1 and FIG. 2 show examples of wireless communication systems that support shortened time domain precoding filters for multi-antenna precoding in accordance with one or more aspects of the present disclosure.

Various aspects generally relate to techniques for multiple antenna (multi-antenna) precoding for orthogonal frequency domain multiplexing (OFDM), such as for discrete Fourier transform-spread-OFDM (DFT-S-OFDM). Some aspects more specifically relate to shortened time domain precoding filters associated with multi-antenna precoding for OFDM. In some examples, a first wireless communication device may use a relatively shorter time domain precoding filter that may be constructed by a reduced quantity of time domain precoding taps relative to other different precoders (such a precoder may be referred to as a "few-taps" precoder). For example, the first wireless communication device (for example, a user equipment (UE)) may select a subset of time domain precoding taps, which may be referred to as significant time domain precoding taps, from a set of time domain precoding taps for precoding a signal for OFDM. The set of time domain precoding taps may correspond to a set of precoding values associated with a set of subcarrier tones (for example, corresponding to one or more antennas) for communication between the first wireless communication device and a second wireless communication device. The first wireless communication device may select the significant time domain precoding taps based on the time domain precoding taps having a larger absolute value than other time domain precoding taps of the set, among other criteria. In some examples, the first wireless communication device may obtain the set of time domain precoding taps in accordance with feedback information such as a CSI (CSI) report (for example, in accordance with an enhanced Type 2 CSI codebook). In other examples, the first wireless communication device may obtain the set of time domain precoding taps in accordance with CSI estimations of an uplink channel (for example, based on channel reciprocity with a downlink channel).

In some implementations, the first wireless communication device may shorten the time domain precoding filter by implementing a transmit channel shortener. For example, the first wireless communication device may configure a transmit channel shortener using multiple parameters, including a delay and a target window length of a target window associated with a shortened channel (for example, an effective channel) that is generated by the transmit channel shortener. The first wireless communication device may configure the transmit channel shortener to scale (such as maximize) a channel energy in the target window. The first wireless communication device may construct the shortened channel in a time domain using the transmit channel shortener, and may perform OFDM with a corresponding shortened channel transformed to the frequency domain. In some examples, the first wireless communication device may use feedback information, such as from a CSI report (for example, in accordance with an enhanced Type 2 CSI codebook) to design the transmit channel shortener.

Particular aspects of the subject matter described herein may be implemented to realize one or more of the following potential advantages. The techniques employed by the described wireless communication devices may enable a flexible tradeoff between one or more metrics, such as a peak to average power ratio (PAPR) and system capacity, by shortening a precoding filter. For example, a UE may use a precoder with a reduced quantity of time domain precoding taps, which may support one or more adjusted metrics, such as a reduced PAPR, for OFDM signals. The UE may preserve a beamforming gain for the OFDM signals by using the precoder with the significant time domain precoding taps. In some examples, the UE may reduce the PAPR for OFDM signals by using a transmit channel shortener. The UE may support an increased power efficiency (for example, an increased power output) by designing the shortened channel (for example, the effective channel) in accordance with the transmit channel shortener. In some implementations, operations performed by the described wireless communication devices via a shortened precoding filter, such as via a subset of time domain precoding taps or a transmit channel shortener, may support higher data rates, greater system capacity, and/or greater spectral efficiency, among other benefits.

Aspects of the disclosure are initially described in the context of wireless communication systems. Aspects of the disclosure are additionally described with reference to a precoding scheme, a channel shortening scheme, and process flows. Aspects of the disclosure are further illustrated by and described with reference to apparatus diagrams, system diagrams, and flowcharts that relate to shortened time domain precoding filters for multi-antenna precoding.

FIG. 1 shows an example of a wireless communication system 100 that supports shortened time domain precoding filters for multi-antenna precoding in accordance with one or more aspects of the present disclosure. The wireless communication system 100 may include one or more network entities 105, one or more UEs 115, and a core network 130. In some examples, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communication with various types of devices, such as other UEs 115 or network entities 105, as shown in FIG. 1.

As described herein, a node of the wireless communication system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communication systems (for example, wireless communication system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communication with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support shortened time domain precoding filters for multi-antenna precoding as described herein. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communication (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or more other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communication system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communication (for example, in an FDD mode) or may be configured to carry downlink and uplink communication (for example, in a TDD mode).

A carrier may be associated with a particular bandwidth of the RF spectrum and, in some examples, the carrier bandwidth may be referred to as a "system bandwidth" of the carrier or the wireless communication system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communication system 100 (for example, the network entities 105, the UEs 115, or both) may have hardware configurations that support communication using a particular carrier bandwidth or may be configurable to support communication using one of a set of carrier bandwidths. In some examples, the wireless communication system 100 may include network entities 105 or UEs 115 that support concurrent communication using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communication resource may refer to a combination of an RF spectrum resource, a time resource, and a spatial resource (for example, a spatial layer, a beam), and the use of multiple spatial resources may increase the data rate or data integrity for communication with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communication for the UE 115 may be restricted to one or more active BWPs.

The time intervals for the network entities 105 or the UEs 115 may be expressed in multiples of a basic time unit which may, for example, refer to a sampling period of $T_s=1/((\Delta f_{max}\cdot N_f))$ seconds, for which $\Delta f_{max}$ may represent a supported subcarrier spacing, and $N_f$ may represent a supported discrete Fourier transform (DFT) size. Time intervals of a communication resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communication systems 100, a slot may further be divided into multiple mini-slots associated with one or more symbols. Excluding the cyclic prefix, each symbol period may be associated with one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communication system 100 and may be referred to as a transmission time interval (TTI). In some examples, the TTI duration (for example, a quantity of symbol periods in a TTI) may be variable. Additionally, or alternatively, the smallest scheduling unit of the wireless communication system 100 may be dynamically selected (for example, in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (for example, a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

The wireless communication system 100 may support synchronous or asynchronous operation. For synchronous operation, network entities 105 (for example, base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communication system 100 may be configured to support ultra-reliable communication or low-latency communication, or various combinations thereof. For example, the wireless communication system 100 may be configured to support ultra-reliable low-latency communication (URLLC). The UEs 115 may be designed to support ultra-reliable, low-latency, or critical functions. Ultra-reliable communication may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communication may be within the coverage area 110 of a network entity 105 (for example, a base station 140, an RU 170), which may support aspects of such D2D communication being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communication may support a one-to-many (1:M) system in which each UE 115 transmits to each of the other UEs 115 in the group. In some examples, a network entity 105 may facilitate the scheduling of resources for D2D communication. In some other examples, D2D communication may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (for example, less than 100 kilometers) compared to communication using the smaller frequencies and longer waves of the high frequency (HF) or very high frequency (VHF) portion of the spectrum below 300 MHz.

The wireless communication system 100 may also operate using a super high frequency (SHF) region, which may be in the range of 3 GHz to 30 GHZ, also known as the centimeter band, or using an extremely high frequency (EHF) region of the spectrum (for example, from 30 GHz to 300 GHz), also known as the millimeter band. In some examples, the wireless communication system 100 may support millimeter wave (mmW) communication between the UEs 115 and the network entities 105 (for example, base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communication, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communication with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communication to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communication with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a transmitting device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communication at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, wireless communication devices (for example, UEs 115 or network entities 105) of the wireless communication system 100 may support wideband communication using FDM. To implement FDM, the wireless communication devices may use guard bands to mitigate adjacent channel interference (ACI), which may reduce spectral efficiency. To support increased spectral efficiency, the wireless communication devices may implement OFDM by positioning subcarriers (for example, tones) orthogonal to each other, which may support compact subcarrier spacing. However, OFDM may be associated with a high PAPR and low power efficiency due to a high output backoff (OBO). In some examples, the wireless communication devices of the wireless communication system 100 may implement DFT-S-OFDM to support reduced PAPR (for example, to enable a reduced PAPR of wireless communication) relative to OFDM.

The wireless communication devices may operate in high frequency bands. For example, OFDM or DFT-S-OFDM may enable the wireless communication devices to support a wide and available bandwidth at some high frequency bands. However, wireless communication at high frequency bands may suffer from pathloss. In accordance with a Friis transmission formula, pathloss for wireless communication may be proportional to operating frequency squared. To mitigate the pathloss due to high operating frequencies of the wireless communication, the wireless communication devices may implement multi-antenna precoding. For example, the wireless communication devices may transmit signals via multiple antennas in accordance with the multi-antenna precoding to concentrate signal power on some spatial directions. The multi-antenna precoding may mitigate the pathloss associated with wireless communication that are communicated via high frequency bands by increasing a beamforming gain associated with the wireless communication.

In some cases, the multi-antenna precoding may increase a PAPR associated with OFDM or DFT-S-OFDM. The multi-antenna precoding may include a frequency domain precoding filter, which may include frequency domain precoding values (for example, precoders) corresponding to each subcarrier (for example, tone). The frequency domain precoding filter may be represented by an equivalent time domain precoding filter that includes time domain precoder taps that correspond to the frequency domain precoding values. In some cases, the increased PAPR associated with multi-antenna precoding of OFDM or DFT-S-OFDM may be associated with an excessive length of the equivalent time domain precoding filter.

In accordance with examples described herein, the wireless communication devices may shorten the equivalent time domain precoding filter associated with multi-antenna precoding of OFDM or DFT-S-OFDM, which may reduce PAPR associated with multi-antenna precoding. In some examples, to shorten the equivalent time domain precoding filter, a first wireless communication device (for example, a UE 115 or a network entity 105) may implement a precoder with a reduced quantity of time domain precoding taps, which may be referred to as a few-taps precoder. For example, the wireless communication device may keep a subset of a set of time domain precoding taps that correspond to the frequency domain precoding values. The wireless communication device may select time domain precoding taps to include in the subset based on the time domain precoding taps having a greater absolute value relative to other time domain precoding taps of the set, which may be referred to as significant time domain precoding taps.

In other examples, to shorten the equivalent time domain precoding filter, the first wireless communication device (for example, a UE 115 or a network entity 105) may utilize a transmit channel shortener to shorten a transmit channel associated with the equivalent time domain precoding filter. The wireless communication device may design the transmit channel shortener using one or more design parameters (for example, a delay, a target window length) and may design the transmit channel shortener to set (such as maximize) a channel energy in a target window of the shortened transmit channel to be larger than other channel energies associated with other transmit channel shorter designs. The transmit channel shortener may be indicative of implicit beamforming that the first wireless communication device uses to transmit signals using MIMO beamforming.

Figure 2:
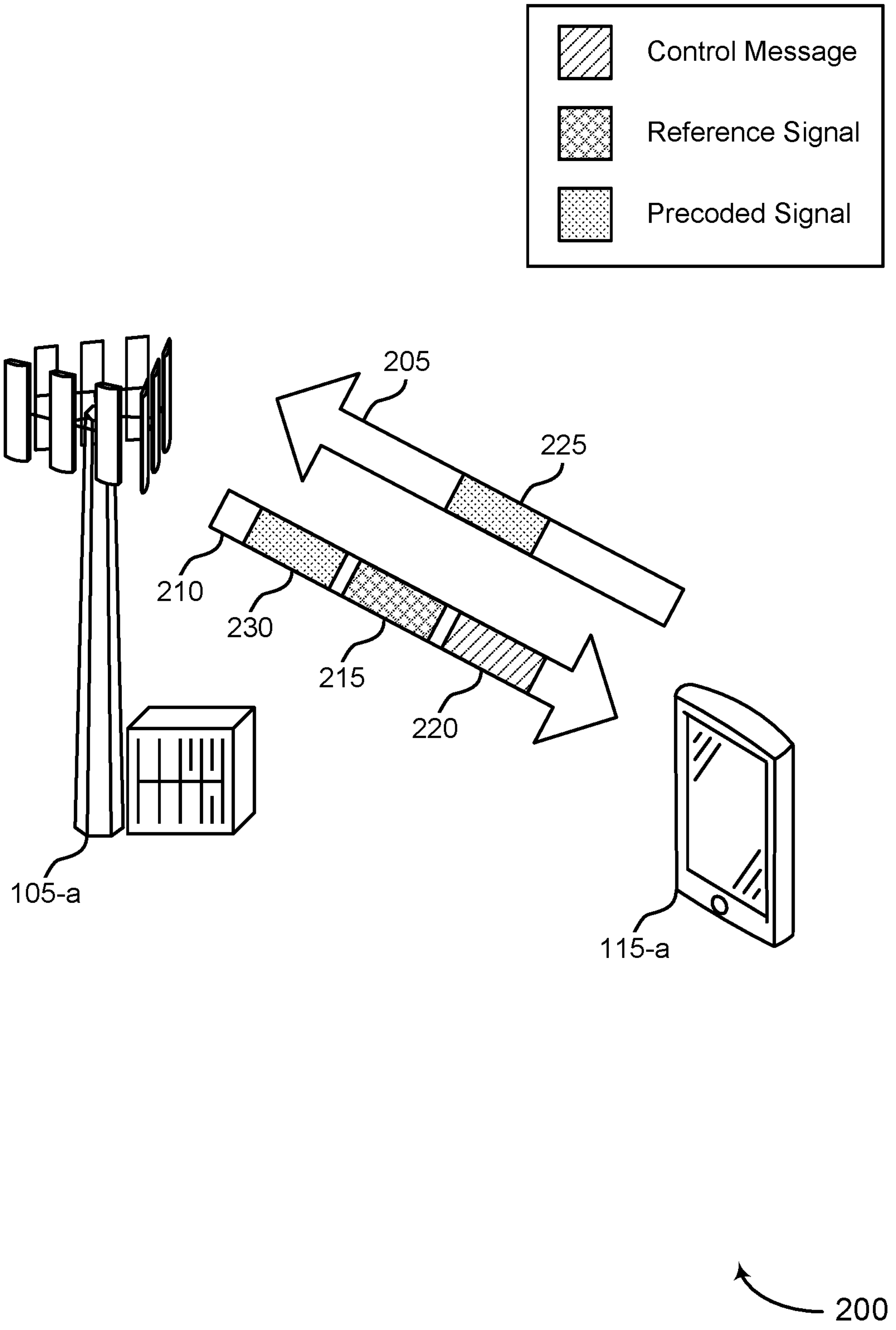

FIG. 2 shows a pictorial example of an example wireless communication system 200 that supports shortened time domain precoding filters for multi-antenna precoding. The wireless communication system may implement aspects of the wireless communication system 100 or may be implemented by aspects of the wireless communication system 100. For example, the wireless communication system 200 may include a UE 115-*a* and a network entity 105-*a*, which may be examples of corresponding devices described herein. The UE 115-*a* may communicate with the network entity 105-*a* via an uplink channel 205 and a downlink channel 210. The uplink channel 205 may support uplink communication (for example, a precoded signal 225) from the UE 115-*a* to the network entity 105-*a*, and the downlink channel 210 may support downlink communication (for example, a control message 220 or one or more reference signals 215) from the network entity 105-*a* to the UE 115-*a*.

In some examples, the UE 115-*a* may implement multi-antenna precoding associated with DFT-S-OFDM based on channel state information (CSI) of an uplink channel 205. The CSI of the uplink channel 205 may be included in the control message 220, or the CSI of the uplink channel 205 may be derived from CSI of the downlink channel 210 based on channel reciprocity. The UE 115-*a* may perform multi-antenna precoding to transmit the precoded signal 225 in accordance with codebook-based or non-codebook based precoding.

In examples of non-codebook-based precoding, the UE 115-*a* may generate (for example, autonomously) a precoding scheme for multi-antenna DFT-S-OFDM based on a channel reciprocity of the uplink channel 205 and a corresponding downlink channel 210 that is associated with the network entity 105-*a*. For example, the UE 115-*a* may receive the one or more reference signals 215 via the downlink channel 210 and may perform measurements (for example, CSI measurements) associated with the downlink channel 210 based on receiving the one or more reference signals 215. The UE 115-*a* may assume channel reciprocity, and based on the channel reciprocity, the UE 115-*a* may obtain channel information of the uplink channel 205. The UE 115-*a* may derive a precoding matrix from the obtained uplink channel information. Using the generated precoding matrix, the UE 115-*a* may precode and transmit a sounding reference signal (SRS) to modify the precoding matrix. For example, the UE 115-*a* may select or remove some candidate beams or candidate precoders from the precoding matrix based on any discrepancy between the downlink channel 210 and the uplink channel 205.

In examples of codebook-based precoding, a UE 115-*a* may use one or more codebooks for transmitting feedback information to a network entity 105-*a*. For example, a CSI report that includes the feedback information may comprise (for example, may be formatted or precoded in accordance with) a CSI codebook. The CSI codebook may be a Type-1 CSI codebook to support Type-1 CSI reporting at the UE 115-*a*, a Type-2 CSI codebook to support Type-2 CSI reporting at the UE 115-*a*, or an enhanced Type-2 CSI codebook to support enhanced Type-2 CSI reporting at the UE 115-*a*. The Type-2 CSI codebook may indicate a more detailed CSI report compared to the Type-1 CSI codebook. For example, the Type-2 CSI codebook may select multiple beams for the UE 115-*a* to include in the CSI report, which may be beneficial for multi-user MIMO implementations to support an increased CSI reporting performance relative to the Type-1 CSI reporting. The Type-2 CSI codebook may also indicate that the UE 115-*a* provides feedback for each subband of a set of multiple subbands.

The UE 115-*a* may transmit a CSI report in accordance with Type-2 CSI reporting, and the CSI report may include a large amount of feedback information relative to Type-1 CSI reporting and may occupy a large quantity of uplink resources of the uplink channel 205. In enhanced Type-2 CSI reporting, however, the UE 115-*a* may compress the feedback information of the CSI report from a frequency domain (for example, subcarrier domain) to a time domain (for example, delay domain), which may reduce the CSI feedback overhead at the UE 115-*a* relative to Type-2 CSI reporting.

The enhanced Type 2 CSI codebook may indicate one or more precoding matrices. For example, the enhanced Type 2 CSI codebook may indicate $\tilde{W}$_2, W_1, and W_f^H, and the UE 115 a may encode the precoded signal 225 according to Equation (1) below.

$$W = \mathrm{W\_1}\,\tilde{W}\mathrm{\_2\,W\_f}^{\wedge}H \tag{1}$$

In Equation (1), $\tilde{W}$_2 may be a compressed version of feedback information associated with the CSI report and may map the feedback information from a time domain to a beam domain. W_1 may be a DFT beam matrix and may compress spatial dimensions from the beam domain to a frequency domain. W_f^H may be an inverse DFT (IDFT) and may compress subband dimensions from the frequency domain to the time domain.

In some examples, the network entity 105-*a* may implement multi-antenna precoding associated with OFDM in accordance with the enhanced Type-2 CSI codebook. For example, the network entity 105-*a* may transmit one or more reference signals to the UE 115-*a*. The UE 115-*a* may measure the one or more reference signals to obtain CSI of the downlink channel 210. The network entity 105-*a* may receive a CSI report from the UE 115-*a* that includes feedback information including the CSI of the downlink channel 210. In some examples, the feedback information may indicate a multi-antenna precoding scheme or a precoding matrix (for example, $\tilde{W}$_2). For example, the feedback information included in the CSI report may comprise, or be in the format of, an enhanced Type 2 CSI codebook. The network entity 105-*a* may precode a signal using the multi-antenna precoding scheme or the precoding matrix.

In accordance with the examples described herein, the network entity 105 a may implement a few-taps precoder in accordance with enhanced Type 2 CSI reporting to select a subset of time domain precoding taps from a set of time domain precoding taps associated with the matrix $\tilde{W}$_2. The few-taps precoder may enable frequency selective precoding, which may reduce a PAPR associated with precoded signals. The matrix $\tilde{W}$_2 may include the feedback information that the UE 115 a reports to the network entity 105 a via enhanced Type 2 CSI reporting. In some examples, the network entity 105 a may receive the CSI report from the UE 115 a and may precode a precoded signal 230 by selecting a subset of time domain precoding taps from the set of time domain precoding taps associated with the matrix $\tilde{W}$_2 (for example, keeping only significant elements in $\tilde{W}$_2). In other examples, prior to transmitting a CSI report to the network entity 105-*a*, the UE 115 a may select a subset of time domain precoding taps from the set of time domain precoding taps associated with the matrix $\tilde{W}$_2 (for example, keeping only significant elements in $\tilde{W}$_2). In such examples, the UE 115 a may support a reduced signaling overhead associated with enhanced Type 2 CSI reporting due to fewer elements in the reported matrix $\tilde{W}$_2 being included in the CSI report.

In other examples, the UE 115-*a* may receive feedback from the network entity 105-*a*, which may include CSI of the uplink channel 205, and the UE 115-*a* may perform precoding based on the CSI of the uplink channel 205. For example, the UE 115 a may transmit one or more reference signals 215 to the network entity 105-*a*. The network entity 105-*a* may measure the one or more reference signals 215 to obtain CSI of the uplink channel 205. The UE 115-*a* may receive a control message 220 from the network entity 105 a that includes feedback information including the CSI of the uplink channel 205. In some examples, the feedback information may indicate a multi-antenna precoding scheme or a precoding matrix. For example, the feedback information included in the control message 220 may take a format that is similar, or the same as, an enhanced Type 2 CSI codebook. The enhanced Type-2 CSI codebook may be configured for downlink CSI reporting. However, the network entity 105-*a* may utilize (for example, may reuse, may borrow, or may apply) the format of the enhanced Type-2 CSI codebook for transmitting the feedback information that indicates the CSI of the uplink channel 205. The UE 115-*a* may precode the signal 225 using the multi-antenna precoding scheme or the precoding matrix indicated by the feedback information from the network entity 105-*a*. In some implementations, in accordance with the examples described herein, the UE 115-*a* may precode the precoded signal 225 by selecting a subset of the precoding matrix. For example, the UE 115-*a* may select significant time domain precoding taps from a set of time domain precoding taps that is indicated by the precoding matrix.

In some examples, the UE 115-*a* may transmit the precoded signal 225 using a transmit channel shortener. For example, the UE 115-*a* may design the transmit channel shortener to shorten a time domain channel associated with the precoded signal 225. The UE 115-*a* may design the transmit channel shortener in accordance with one or more design parameters to scale (such as maximize) a channel energy in a target window of the shortened channel relative to other designs that use other transmit channel shorteners. The UE 115-*a* may transform the shortened time domain channel to the frequency domain to generate a frequency domain channel that is in accordance with the transmit channel shortener and may transmit the precoded signal 225 via the transformed frequency domain channel.

In some examples, the network entity 105 a may indicate the transmit channel shortener to the UE 115 a via the control message 220. In other examples, the UE 115-*a* may indicate the transmit channel shortener to the network entity 105-*a*. For example, the UE 115-*a* may transmit a CSI report to the network entity 105-*a* that may indicate the enhanced Type-2 CSI codebook, which may include the matrices in Equation (1). The matrix W_1 and the matrix $\tilde{W}$_2 may indicate the transmit channel shortener. For example, a convolution of the matrix W_1 and the matrix $\tilde{W}$_2 may output a matrix that corresponds to the transmit channel shortener transposed. Additionally, or alternatively, the UE 115-*a* may generate (for example, select or design) a transmit channel shortener associated with a CSI report (for example, the precoded signal 225) in accordance with enhanced Type-2 CSI reporting. An enhanced Type-2 CSI codebook may indicate the transmit channel shortener. For example, the enhanced Type-2 CSI codebook may include the matrix W_1 and the matrix $\tilde{W}$_2, and the matrix W_1 and the matrix $\tilde{W}$_2 (for example, a convolution of the matrix W_1 and the matrix $\tilde{W}$_2, W_1 $\tilde{W}$_2) may indicate the transmit channel shortener. In some examples, the UE 115-*a* may perform a transposition of W_1 $\tilde{W}$_2 to obtain the transmit channel shortener. The UE 115-*a* may transmit the precoded signal 225 in accordance with the transmit channel shortener.

In some examples, use of a subset of time domain precoding taps (for example, a few-taps precoder) or a transmit channel shortener to perform multi-antenna precoding described herein may be activated or deactivated via signaling. For example, the network entity 105-*a* may transmit signaling to the UE 115-*a* (or vice versa), such as downlink control information (DCI), RRC signaling, or a MAC-control element (MAC-CE), to activate or deactivate the use of the subset of time domain precoding taps or the transmit channel shortener to perform multi-antenna precoding. Additionally, or alternatively, another wireless communication device may transmit the signaling to the UE 115-*a* and the network entity 105-*a* (for example, another network entity 105 transmitting the signaling to the UE 115-*a* and the network entity 105-*a*).

In some examples, use of a subset of time domain precoding taps (for example, a few-taps precoder) or a transmit channel shortener to perform multi-antenna precoding described herein may be conditioned on both the UE 115-*a* and the network entity 105-*a* supporting the use of the subset of time domain precoding taps or the transmit channel shortener. In some examples, the UE 115-*a* may transmit capability signaling (for example, capability reporting) to the network entity 105-*a* to indicate its support (or lack of support) for the use of the subset of time domain precoding taps or the transmit channel shortener.

Figure 3:
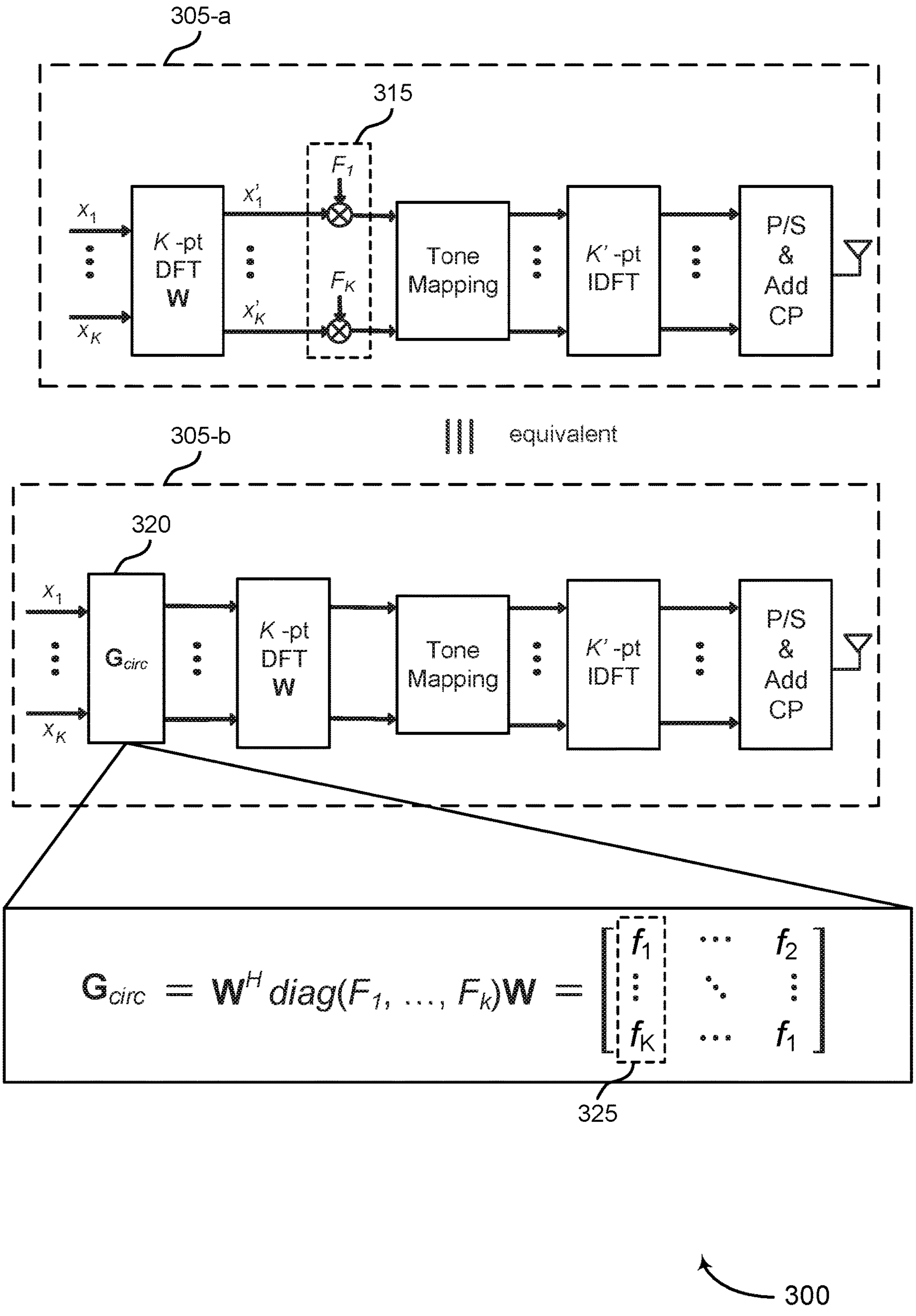
FIG. 3 shows an example of a precoding scheme that supports shortened time domain precoding filters for multi-antenna precoding in accordance with one or more aspects of the present disclosure.

FIG. 3 shows a precoding scheme 300 that supports shortened time domain precoding filters for multi-antenna precoding in accordance with one or more aspects of the present disclosure. The precoding scheme 300 may implement or may be implemented by aspects of the wireless communication system 100 or the wireless communication system 200 as described with reference to FIGS. 1 and 2. For example, the precoding scheme 300 may be implemented by a UE 115 to precode and transmit the precoded signal 225 to the network entity 105-*a*.

The precoding scheme 300 may include a precoder 305-*a* that the UE 115 uses to precode a signal using OFDM or DFT-S-OFDM in accordance with multi-antenna precoding. The precoder 305-*a* may correspond to subcarriers of one antenna for multi-antenna precoding. For example, the UE 115 may precode a signal x (or a subset of a signal) using the precoder 305-*a* to transmit a signal via one antenna over a set of subcarriers K. For multi-antenna precoding, the UE 115 may extend the precoder 305-*a* over multiple sets of subcarriers K of a channel (for example, a $1 \times N_r$ multiple-input-single-output (MISO) channel). Each set K of the multiple sets of subcarriers (for example, $N_r$ sets of subcarriers) may correspond to an antenna of the UE 115, and the UE 115 may transmit the signal via the multiple antennas and via the multiple sets of subcarriers. In this manner, the precoder 305-*a* may illustrate a subset of a precoder that the UE 115 uses to transmit the precoded signal (for example, the precoded signal 225). A linear minimum mean square error (LMMSE) receiver (for example, a network entity 105) may receive the precoded signal and may decode the precoded signal.

The precoder 305 a may include a set of frequency domain precoding values 315 across the set of subcarriers K (for example, across tones). Each of the frequency domain precoding values may correspond to a respective subcarrier k of the set of subcarriers K. The set of frequency domain precoding values may be denoted by {F_1 . . . F_K}. In the precoder 305 a, the UE 115 may use the set of frequency domain precoding values 315 to precode the signal x', which may denote the signal x after a DFT of the signal x to the frequency domain (for example, using a K-point DFT associated with a matrix W). However, in an equivalent precoder 305 *b*, which may be equivalent to the precoder 305 a, the UE 115 may use a precoding matrix 320 (for example, a circular matrix G_circ) to precode the signal x in the time domain prior to a discrete Fourier transform of the signal x.

The precoding matrix 320 may include a set of time domain precoding taps 325. Each time domain precoding tap of the set of time domain precoding taps 325 may correspond to a respective frequency domain precoding value of the set of frequency domain precoding values 315. For example, the set of time domain precoding taps 325 may be denoted by $\{f_1 \ldots f_K\}$, which may correspond to the set $\{F_1 \ldots FR\}$. The set of time domain precoding taps 325 may correspond to a respective set of signals on K subcarriers.

In accordance with examples described herein, a wireless communication device (for example, the UE 115 or a network entity 105) may select a subset of the set of time domain precoding taps 325 to perform multi-antenna precoding of the signal x in accordance with OFDM or DFT-S-OFDM. For example, the wireless communication device may select M significant time domain precoding taps from the set of time domain precoding taps $\{f_1 \ldots f_K\}$, and may include the M significant time domain precoding taps in a subset $\mathcal{S}$ (for example, the subset of time domain precoding values), according to Equation (2) below.

$$\mathcal{S} = \arg \max_{\mathcal{S} \subset \{f_1, \ldots, f_K\}, |\mathcal{S}| = M} \sum_{f \in \mathcal{S}} |f|^2 \tag{2}$$

In Equation (2), the wireless communication device selects, for inclusion in the subset $\mathcal{S}$, a subset of time domain precoding values each with a respective absolute value that is greater than a respective absolute value of each of one or more other (for example, all other) time domain precoding values of the set $\{f_1 \ldots f_K\}$. The selected subset S may be referred to as the significant time domain precoding taps and may correspond to (for example, match) dominant frequency domain precoding values (for example, dominant channel taps) of the set of frequency domain precoding values, $\{F_1 \ldots F_K\}$. The dominant frequency domain precoding values may be equivalent frequency domain precoding values with respect to the significant time domain precoding taps.

The wireless communication device may select the subset of time domain precoding values for inclusion in the subset S such that a quantity of time domain precoding values in the subset S is equal to M. In some examples, the wireless communication device may select a single time domain precoding tap (for example, M=1) for inclusion in the subset S, and the single time domain precoding tap may have a greater absolute value than all other time domain precoding taps of the set $\{f_1 \ldots f_K\}$. In other examples, the wireless communication device may select more than one time domain precoding tap for inclusion in the subset S (for example, M>1).

Based on the selected subset S of time domain precoding taps, the wireless communication device may generate a second precoding matrix associated with the subset S. To generate the second precoding matrix, the wireless communication device may select a subset of the precoding matrix 320, according to Equation (3) below.

$$\hat{f}_k = \begin{cases} f_k, & \text{if } f_k \in \mathcal{S} \\ 0, & \text{if } f_k \notin \mathcal{S} \end{cases} \tag{3}$$

In Equation (3), for each time domain precoding tap $f_K$ of the precoding matrix 320, the second precoding matrix may keep $f_K$ (for example, each instance of $f_K$ in the precoding matrix 320) in examples in which the subset S includes $f_K$. In examples in which the subset S does not include $f_K$, the second precoding matrix may replace $f_K$ (for example, each instance of $f_K$ in the precoding matrix 320) with a zero.

In some examples, the wireless communication device may perform a power normalization of the precoded signal in accordance with the selected subset S of time domain precoding values. For example, the wireless communication device may select one or more scaling factors associated with the power normalization of the set of subcarriers K and the one or more scaling factors may be associated with the subset S.

Figure 4:
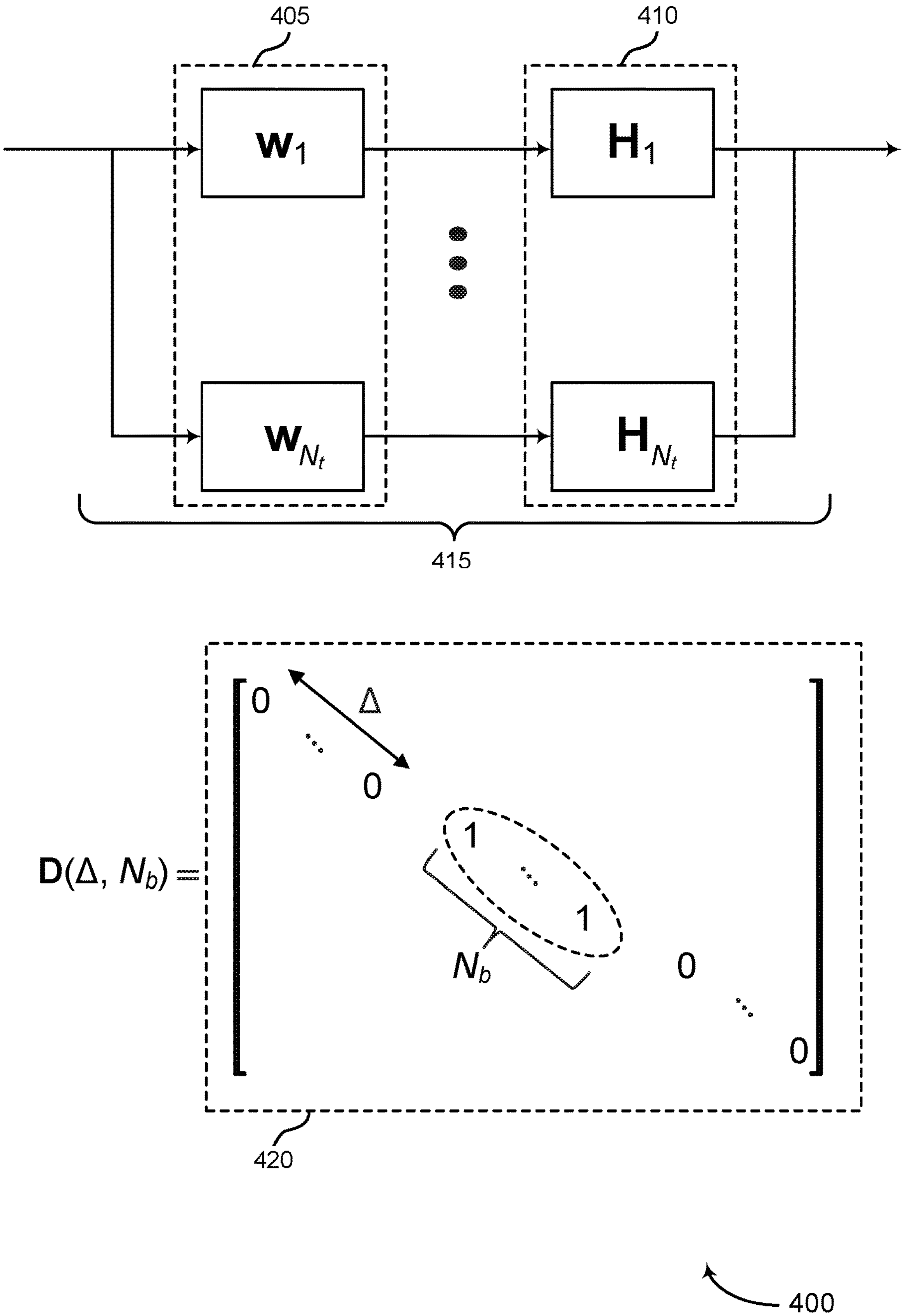
FIG. 4 shows an example of a channel shortening scheme that supports shortened time domain precoding filters for multi-antenna precoding in accordance with one or more aspects of the present disclosure.

FIG. 4 shows an example of a channel shortening scheme 400 that supports shortened time domain precoding filters for multi-antenna precoding in accordance with one or more aspects of the present disclosure. The channel shortening scheme 400 may implement or may be implemented by aspects of the wireless communication system 100 or the wireless communication system 200 as described with reference to FIGS. 1 and 2. For example, the channel shortening scheme 400 may include a shortened channel 415 via which a transmitting wireless communication device (for example, the UE 115 or a network entity 105) may precode and transmit wireless communication.

The channel shortening scheme 400 may include a shortened channel 415, which may be a single-input-single-output (SISO) channel. The transmitting wireless communication device may construct the shortened channel 415 using a transmit channel shortener 405, denoted by a vector w. The transmitting wireless communication device may construct the shortened channel 415 according to Equation (4) below.

$$\hat{g} = Hw = \begin{bmatrix} H_1 & \ldots & H_{N_t} \end{bmatrix} \begin{bmatrix} w_1 \\ \vdots \\ w_{N_t} \end{bmatrix} \tag{4}$$

In Equation (4), the transmitting wireless communication device may generate the shortened channel 415 in the time domain, denoted by g, by performing a convolution of the transmit channel shortener w with a channel matrix 410 in the time domain, denoted by H. The transmit channel shortener w_i may correspond to a transmit channel shortener for an i-th antenna and the channel matrix H_i may correspond to a MIMO inter-symbol interference (ISI) channel of the i-th antenna. The channel matrix 410 may include a set of vectors corresponding to a set of subcarriers. The channel matrix may correspond to a set of time domain channel taps associated with a set of subcarriers.

In some examples, the transmitting wireless communication device may design (for example, generate or select) the transmit channel shortener 405 to scale (such as to maximize) a channel energy associated with the shortened channel 415 in a target window. For example, the transmitting wireless communication device may select the transmit channel shortener 405 from a set of candidate transmit channel shorteners. To design the transmit channel shortener 405, the transmitting wireless communication device may tune (for example, adjust) various design parameters to focus the channel energy associated with the shortened channel 415 in a target window length, $N_b$. The design parameters may include the target window length, $N_b$, and a time delay (for example, a time delay associated with a finite impulse response (FIR)), denoted by $\Delta$.

Based on the design parameters, the transmitting wireless communication device may generate a diagonal matrix 420 that is indicative of the time delay, $\Delta$, and the target window length, $N_b$, of the target window. For example, $N_b$ may indicate a quantity of matrix elements to include in the target window, and $\Delta$ may indicate a quantity of zeros that precede the target window. The transmitting wireless communication device may calculate the channel energy associated with the transmit channel shortener 405 in accordance with the diagonal matrix 420. In some examples, the transmitting wireless communication device may calculate a channel energy associated with each candidate transmit channel shortener of the set of candidate transmit channel shorteners, which may each be associated with different values of $\Delta$ and $N_b$. The transmitting wireless communication device may select the transmit channel shortener 405 from the set of candidate transmit channel shorteners based on a channel energy associated with the transmit channel shortener being greater than a respective channel energy associated with each of one more other (for example, all other) transmit channel shorteners of the set of candidate transmit channel shorteners.

In some examples, the transmitting wireless communication device may select or generate the transmit channel shortener 405 according to Equation (5) below.

$$w_{opt} = \arg\max_{w} w^{\dagger}\left(H^{\dagger}D^{\dagger}DH\right)w, \text{ s.t. } w^{\dagger}w = 1 \tag{5}$$

In Equation (5), the transmit channel shortener 405 may be denoted as w_opt, H may denote the channel matrix 410 in the time domain, and D may denote the target window associated with the shortened channel 415. In accordance with Equation (5), the transmitting wireless communication device may select the transmit channel shortener 405 based on a dominant eigenvector of H^†D^†DH.

Based on constructing (for example, generating) the shortened channel 415 using the transmit channel shortener 405, the transmitting wireless communication device may perform OFDM or DFT-S-OFDM in accordance with the shortened channel 415. For example, the transmitting wireless communication device may precode and transmit signals (for example, the precoded signal 225) via the shortened channel 415. The transmitting wireless communication device may perform beamforming implicitly. For example, the transmit channel shortener 405 may implicitly indicate beamforming for signals transmitted using OFDM or DFT-S-OFDM across multiple antennas or subbands. In some examples, a PAPR for a signal transmitted via the shortened channel 415 may be based on a filter length, N_w, of the transmit channel shortener. The transmit channel shortener w_i may correspond to a vector with dimensions N_w×1 for the i-th antenna of a set of antennas, N_t. For w=⟦ [w_1, . . . , w_(N_t)]⟧ ^T, w may correspond to a vector with dimensions (N_w*N_t)×1 for the N_t antennas.

Figure 5:
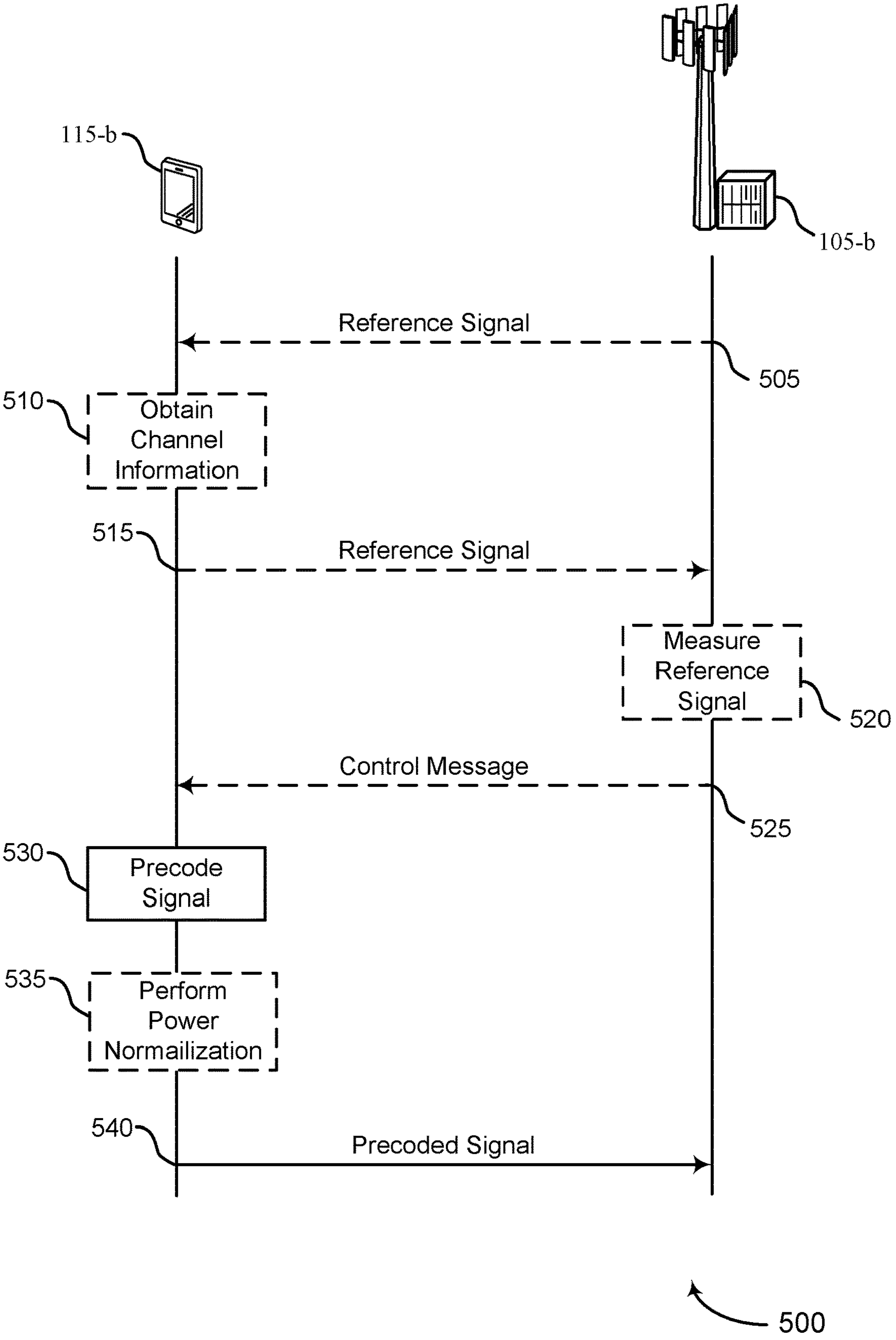
FIGS. 5 and 6 show examples of process flows that support shortened time domain precoding filters for multi-antenna precoding in accordance with one or more aspects of the present disclosure.

FIG. 5 shows an example of a process flow 500 that supports shortened time domain precoding filters for multi-antenna precoding in accordance with one or more aspects of the present disclosure. The process flow 500 may implement or may be implemented by aspects of the wireless communication system 100 or the wireless communication system 200. For example, the process flow 500 may include a UE 115-*b* and a network entity 105-*b*, which may be examples of corresponding devices as described with reference to FIGS. 1 and 2.

In the following description of the process flow 500, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 500, and other operations may be added to the process flow 500.

At 505, the UE 115-*b* may receive one or more downlink reference signals. At 510, the UE 115-*a* may obtain CSI of an uplink channel. In some examples, the UE 115-*b* may generate (for example, autonomously, or in accordance with non-codebook-based precoding) a second precoding matrix that is associated with the subset of time domain precoding taps. The UE 115-*b* may generate the second precoding matrix in accordance with channel information of an uplink channel that is associated with the one or more downlink reference signals. The channel information of the uplink channel may be associated with measurements (for example, CSI measurements) of the one or more downlink reference signals. In some examples, the UE 115-*a* may estimate the CSI of the uplink channel based on CSI measurements of the one or more downlink reference signals. The estimation of the CSI of the uplink channel may be based on a channel reciprocity between the uplink channel and a downlink channel (for example, a reciprocal downlink channel to the uplink channel) that is associated with the one or more reference signals.

At 515, the UE 115-*b* may transmit one or more uplink reference signals to the network entity 105-*b*. At 520, the network entity 105-*b* may measure the one or more uplink reference signals and may obtain CSI of the uplink channel based one or more measurements of the uplink reference signals.

At 525, the UE 115-*b* may receive an indication of a precoding matrix (for example, W˜ _2) associated with a set of time domain precoding taps (for example, {f_1 . . . f_K}). Each of the set of time domain precoding taps may correspond to a respective precoding value of a set of precoding values (for example, {F_1 . . . . F_K}) associated with a set of subcarriers (for example, a set of subcarriers K). The UE 115-*b* may select a subset of the precoding matrix associated with a subset of time domain precoding taps (for example, the subset S) from the set of time domain precoding taps (for example, for inclusion in a few-taps precoder). The UE 115-*b* may receive the indication of the precoding matrix from the network entity 105-*b* via a control message, such as a DCI message or other control signaling. For example, in accordance with codebook-based-precoding, the control message may include feedback information associated with the uplink channel of the UE 115-*b*. The control message may include CSI of the uplink channel or may include one or more measurements of the one or more uplink reference signals.

At 530, the UE 115-*b* may precode a signal in accordance with the subset of time domain precoding taps (for example, in accordance with the selected subset of the precoding matrix or in accordance with the second precoding matrix). A respective absolute value of each of the subset of time domain precoding taps may be greater than a respective absolute value of each of one or more other (for example, all other) time domain precoding taps of the set of time domain precoding taps. The network entity 105-*b* may indicate (for example, via the control message), or the UE 115-*b* may select, a quantity of time domain precoding taps (for example, M significant time domain precoding taps) to include in the subset of time domain precoding taps.

At 535, the UE 115-*b* may select one or more scaling factors associated with a power normalization of the set of subcarriers. The one or more scaling factors may be associated with the subset of time domain precoding taps. The UE 115-*b* may perform the power normalization of the set of subcarriers in accordance with the one or more scaling factors.

At 540, the UE 115-*b* may transmit the signal (for example, a data signal) in accordance with the precoding via the set of subcarriers. In some examples, the UE 115-*b* may select the subset of time domain precoding taps and may encode the signal (for example, may encode the signal in association with a DMRS) in accordance with the subset of time domain precoding taps before transmitting signal to the network entity 105-*a*.

Figure 6:
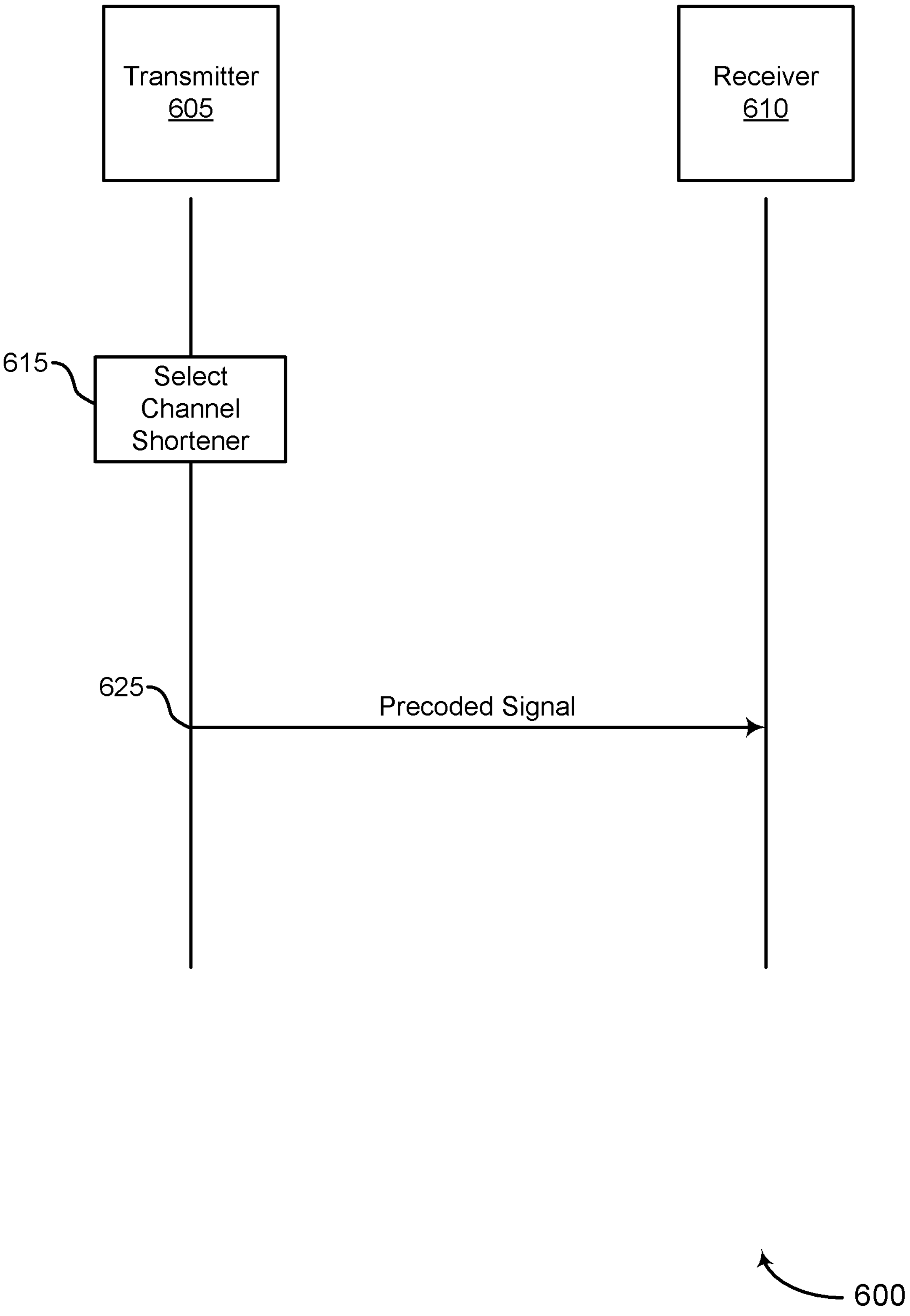

FIG. 6 shows an example of a process flow 600 that supports shortened time domain precoding filters for multi-antenna precoding in accordance with one or more aspects of the present disclosure. The process flow 600 may implement or may be implemented by aspects of the wireless communication system 100 or the wireless communication system 200. For example, the process flow 600 may include a transmitter 605 and a receiver 610, which may be examples of corresponding devices as described with reference to FIGS. 1 and 2 (for example, a UE 115 or a network entity 105).

In the following description of the process flow 600, the operations between the transmitter 605 and the receiver 610 may be transmitted in a different order than the example order shown, or the operations performed by the transmitter 605 and the receiver 610 may be performed in different orders or at different times. Some operations may also be omitted from the process flow 600, and other operations may be added to the process flow 600.

At 615, the transmitter 605 may select, from a set of candidate transmit channel shorteners, a transmit channel shortener (for example, a matrix w) to apply to a set of subcarriers of a channel. A channel energy associated with the transmit channel shortener may be greater than a respective channel energy associated with each of one or more other transmit channel shorteners of the set of candidate transmit channel shorteners. For example, the transmitter 605 may generate a diagonal matrix that is indicative of a time delay (for example, 4) and a target window length (for example, $N_b$) of a target window associated with the selected transmit channel shortener. The transmitter 605 may calculate the channel energy associated with the transmit channel shortener in accordance with the diagonal matrix. In some examples, the transmitter 605 may generate a respective diagonal matrix associated with each of the set of candidate transmit channel shorteners. The transmitter 605 may calculate a respective channel energy associated with each of the candidate transmit channel shorteners in accordance with the respective diagonal matrix and may select the transmit channel shortener based on the calculating.

At 625, the transmitter 605 may transmit a signal in accordance with the selected transmit channel shortener via the set of subcarriers of the channel. In some examples, the transmitter 605 may precode the signal in accordance with a CSI report that comprises an enhanced Type-2 CSI codebook. In some examples, the transmitter 605 may transmit the signal via a second channel, and the second channel may comprise the channel and the transmit channel shortener. For example, the second channel may be an equivalent shortened channel with reference to the channel. In some examples, the transmitter 605 may perform a convolution of the selected transmit channel shortener with a channel matrix in the time domain (for example, a matrix H). The channel matrix may include a set of time domain channel taps associated with the set of subcarriers.

Figure 7:
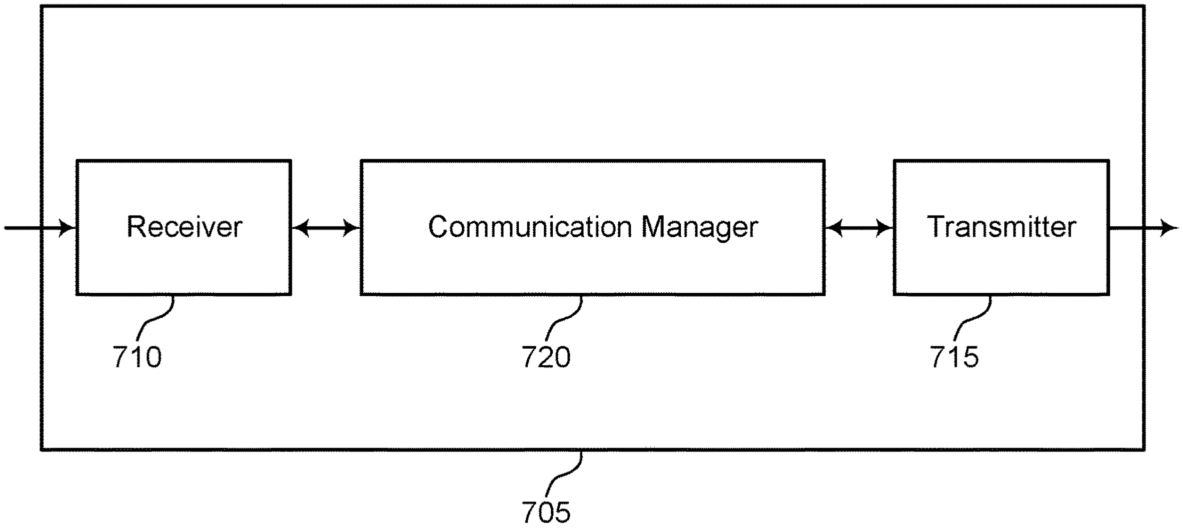
FIGS. 7 and 8 show block diagrams of devices that support shortened time domain precoding filters for multi-antenna precoding in accordance with one or more aspects of the present disclosure.

FIG. 7 shows a block diagram of a device 705 that supports shortened time domain precoding filters for multi-antenna precoding in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to shortened time domain precoding filters for multi-antenna precoding). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to shortened time domain precoding filters for multi-antenna precoding). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of shortened time domain precoding filters for multi-antenna precoding as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 is capable of, configured to, or operable to support a means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The communications manager 720 is capable of, configured to, or operable to support a means for transmitting the signal in accordance with the precoding via the set of subcarriers.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing, reduced power consumption, reduced PAPR, and reduced decoding complexity.

Figure 8:
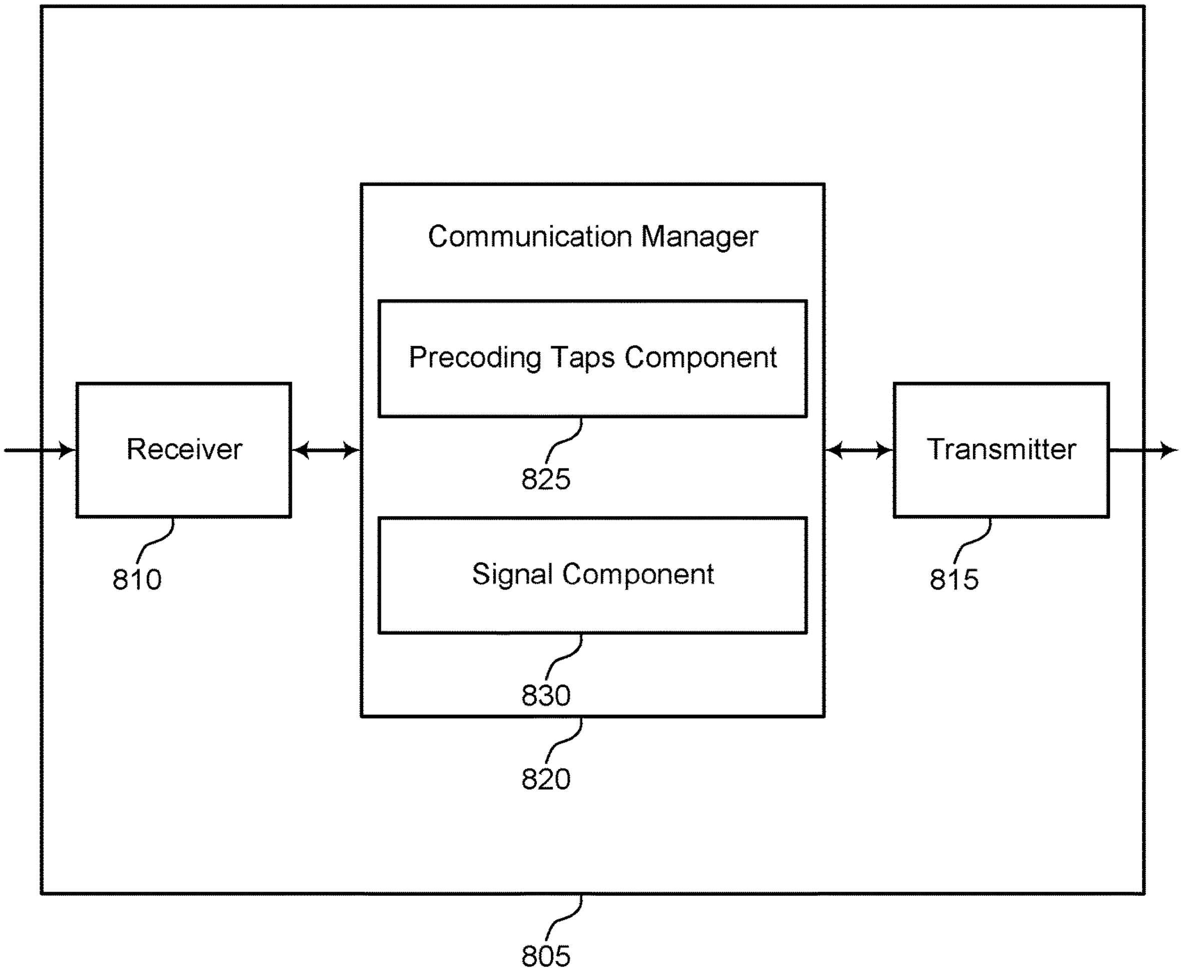

FIG. 8 shows a block diagram of a device 805 that supports shortened time domain precoding filters for multi-antenna precoding in accordance with one or more aspects of the present disclosure. The device 805 may be an example of aspects of a device 705 or a UE 115 as described herein. The device 805 may include a receiver 810, a transmitter 815, and a communications manager 820. The device 805, or one of more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to shortened time domain precoding filters for multi-antenna precoding). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to shortened time domain precoding filters for multi-antenna precoding). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of shortened time domain precoding filters for multi-antenna precoding as described herein. For example, the communications manager 820 may include a precoding taps component 825 a signal component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The precoding taps component 825 is capable of, configured to, or operable to support a means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The signal component 830 is capable of, configured to, or operable to support a means for transmitting the signal in accordance with the precoding via the set of subcarriers.

Figure 9:
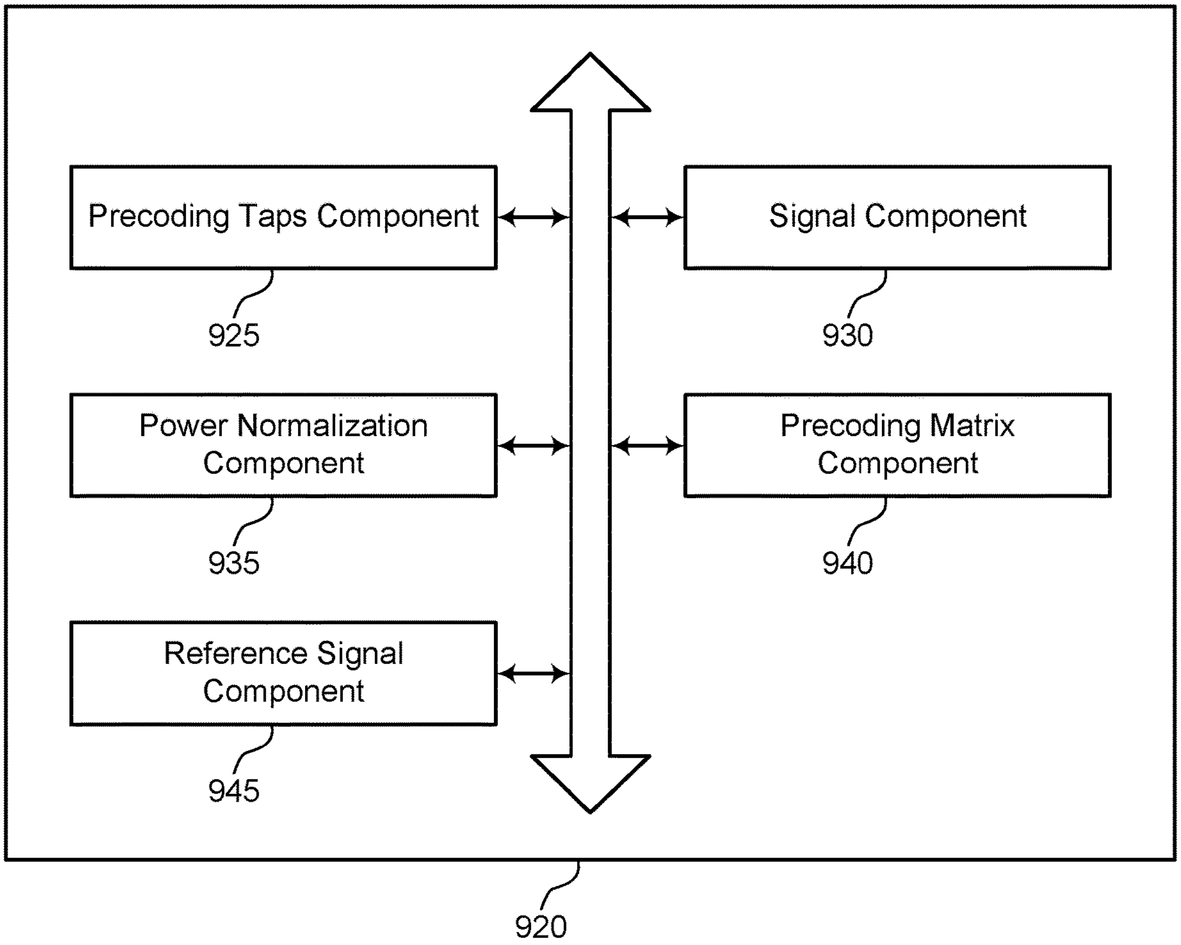
FIG. 9 shows a block diagram of a communication manager that supports shortened time domain precoding filters for multi-antenna precoding in accordance with one or more aspects of the present disclosure.

FIG. 9 shows a block diagram of a communications manager 920 that supports shortened time domain precoding filters for multi-antenna precoding in accordance with one or more aspects of the present disclosure. The communications manager 920 may be an example of aspects of a communications manager 720, a communications manager 820, or both, as described herein. The communications manager 920, or various components thereof, may be an example of means for performing various aspects of shortened time domain precoding filters for multi-antenna precoding as described herein. For example, the communications manager 920 may include a precoding taps component 925, a signal component 930, a power normalization component 935, a precoding matrix component 940, a reference signal component 945, or any combination thereof. Each of these components, or components or subcomponents thereof (e.g., one or more processors, one or more memories), may communicate, directly or indirectly, with one another (e.g., via one or more buses).

The communications manager 920 may support wireless communication in accordance with examples as disclosed herein. The precoding taps component 925 is capable of, configured to, or operable to support a means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The signal component 930 is capable of, configured to, or operable to support a means for transmitting the signal in accordance with the precoding via the set of subcarriers.

In some examples, the power normalization component 935 is capable of, configured to, or operable to support a means for selecting one or more scaling factors associated with a power normalization of the set of subcarriers, the one or more scaling factors being associated with the subset of time domain precoding taps. In some examples, the power normalization component 935 is capable of, configured to, or operable to support a means for performing the power normalization of the set of subcarriers in accordance with the one or more scaling factors.

In some examples, to support precoding the signal, the precoding matrix component 940 is capable of, configured to, or operable to support a means for precoding the signal using a precoding matrix that is associated with the subset of time domain precoding taps.

In some examples, the reference signal component 945 is capable of, configured to, or operable to support a means for receiving one or more downlink reference signals. In some examples, the precoding matrix component 940 is capable of, configured to, or operable to support a means for generating the precoding matrix in accordance with channel information of an uplink channel that is associated with the one or more downlink reference signals, the channel information of the uplink channel being associated with measurements of the one or more downlink reference signals.

In some examples, the signal includes a sounding reference signal, and the precoding taps component 925 is capable of, configured to, or operable to support a means for selecting a second subset of time domain precoding taps from the set of time domain precoding taps in association with transmitting the sounding reference signal.

In some examples, the precoding matrix component 940 is capable of, configured to, or operable to support a means for receiving an indication of a precoding matrix associated with the set of time domain precoding taps. In some examples, the precoding matrix component 940 is capable of, configured to, or operable to support a means for selecting a subset of the precoding matrix associated with the subset of time domain precoding taps, the precoding of the signal being in accordance with the selected subset of the precoding matrix.

In some examples, to support receiving the indication of the precoding matrix, the precoding matrix component 940 is capable of, configured to, or operable to support a means for receiving control signaling that indicates the precoding matrix.

In some examples, the signal includes a channel state information report in accordance with an enhanced Type 2 channel state information codebook.

Figure 10:
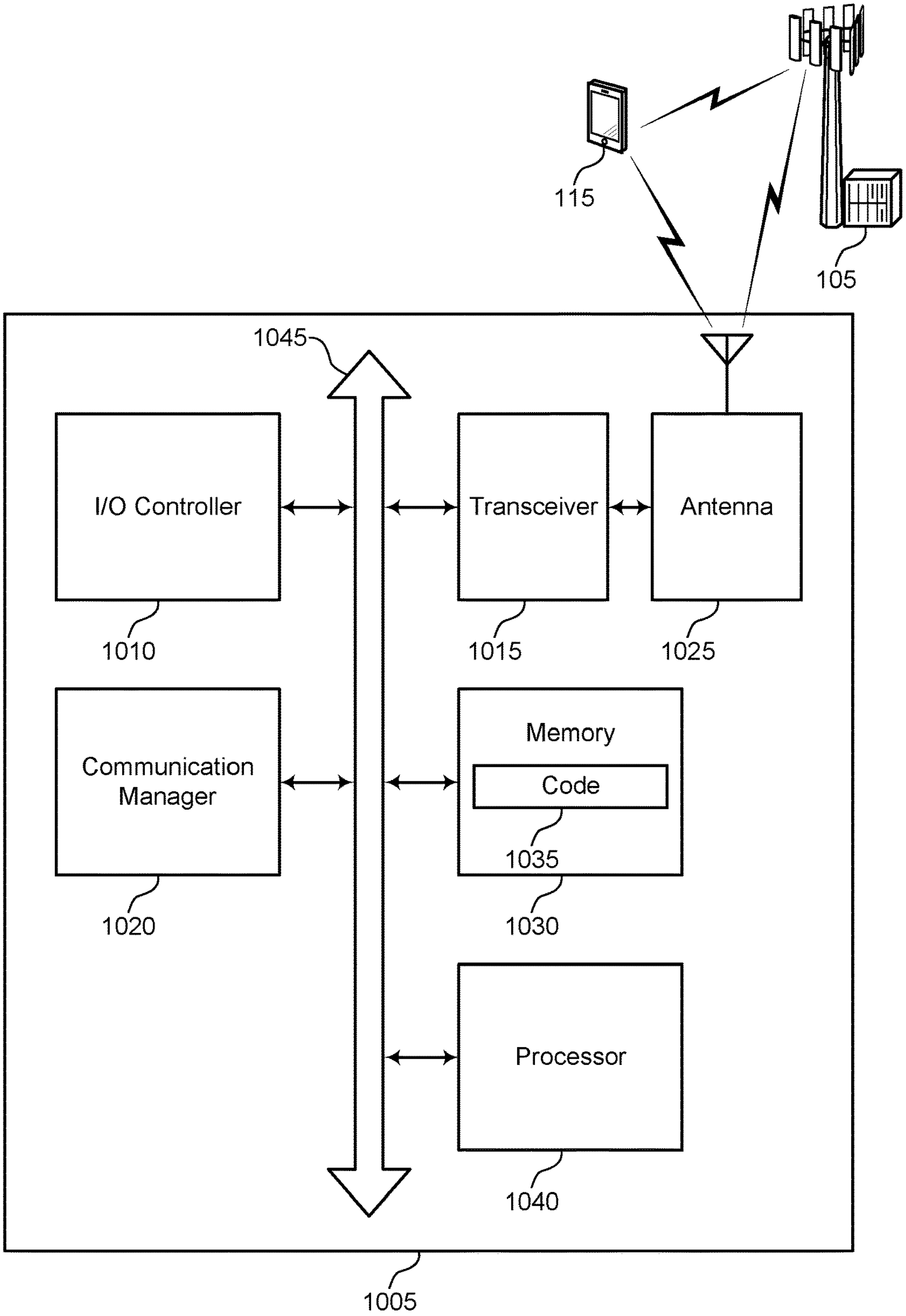
FIG. 10 shows a diagram of a system including a device that supports shortened time domain precoding filters for multi-antenna precoding in accordance with one or more aspects of the present disclosure.

FIG. 10 shows a diagram of a system including a device 1005 that supports shortened time domain precoding filters for multi-antenna precoding in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting shortened time domain precoding filters for multi-antenna precoding). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. As such, the at least one processor 1040 or a processing system including the at least one processor 1040 may be configured to, configurable to, or operable to cause the device 1005 to perform one or more of the functions described herein. Further, as described herein, being “configured to,” being “configurable to,” and being “operable to” may be used interchangeably and may be associated with a capability, when executing code stored in the at least one memory 1030 or otherwise, to perform one or more of the functions described herein.

The communications manager 1020 may support wireless communication in accordance with examples as disclosed herein. For example, the communications manager 1020 is capable of, configured to, or operable to support a means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The communications manager 1020 is capable of, configured to, or operable to support a means for transmitting the signal in accordance with the precoding via the set of subcarriers.

By including or configuring the communications manager 1020 in accordance with examples as described herein, the device 1005 may support techniques for increased throughput, reduced encoding and decoding complexity, reduced transmitter and receiver complexity, higher spectrum efficiency, reduced power consumption, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the a communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of shortened time domain precoding filters for multi-antenna precoding as described herein, or the at least one processor 1040 and the at least one memory 1030 may be otherwise configured to, individually or collectively, perform or support such operations.

Figure 11:
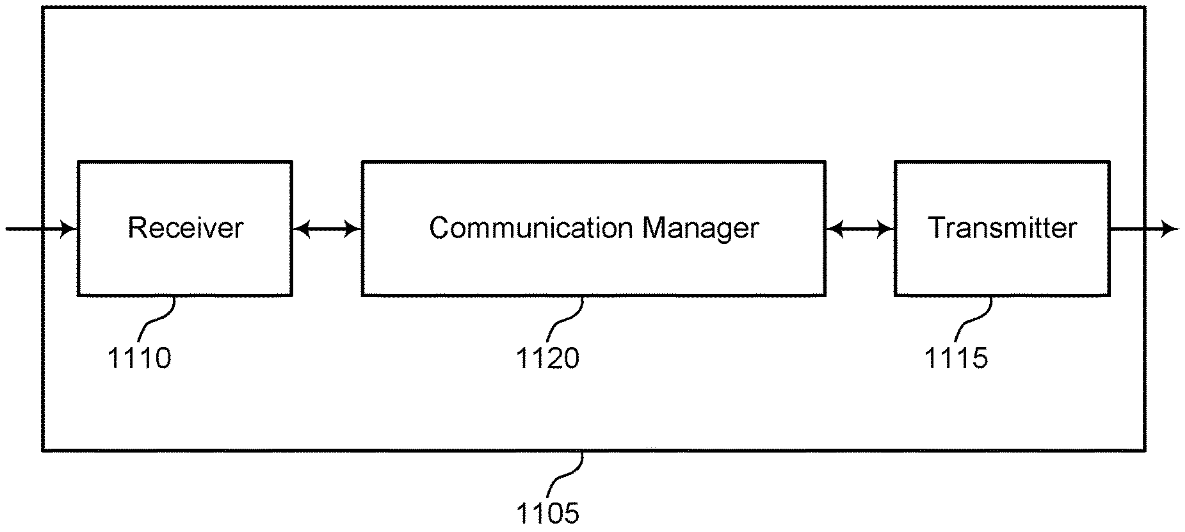
FIGS. 11 and 12 show block diagrams of devices that support shortened time domain precoding filters for multi-antenna precoding in accordance with one or more aspects of the present disclosure.

FIG. 11 shows a block diagram of a device 1105 that supports shortened time domain precoding filters for multi-antenna precoding in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of shortened time domain precoding filters for multi-antenna precoding as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. For example, the communications manager 1120 is capable of, configured to, or operable to support a means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The communications manager 1120 is capable of, configured to, or operable to support a means for transmitting the signal in accordance with the precoding via the set of subcarriers.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for reduced processing, reduced power consumption, reduced PAPR, and reduced decoding complexity.

Figure 12:
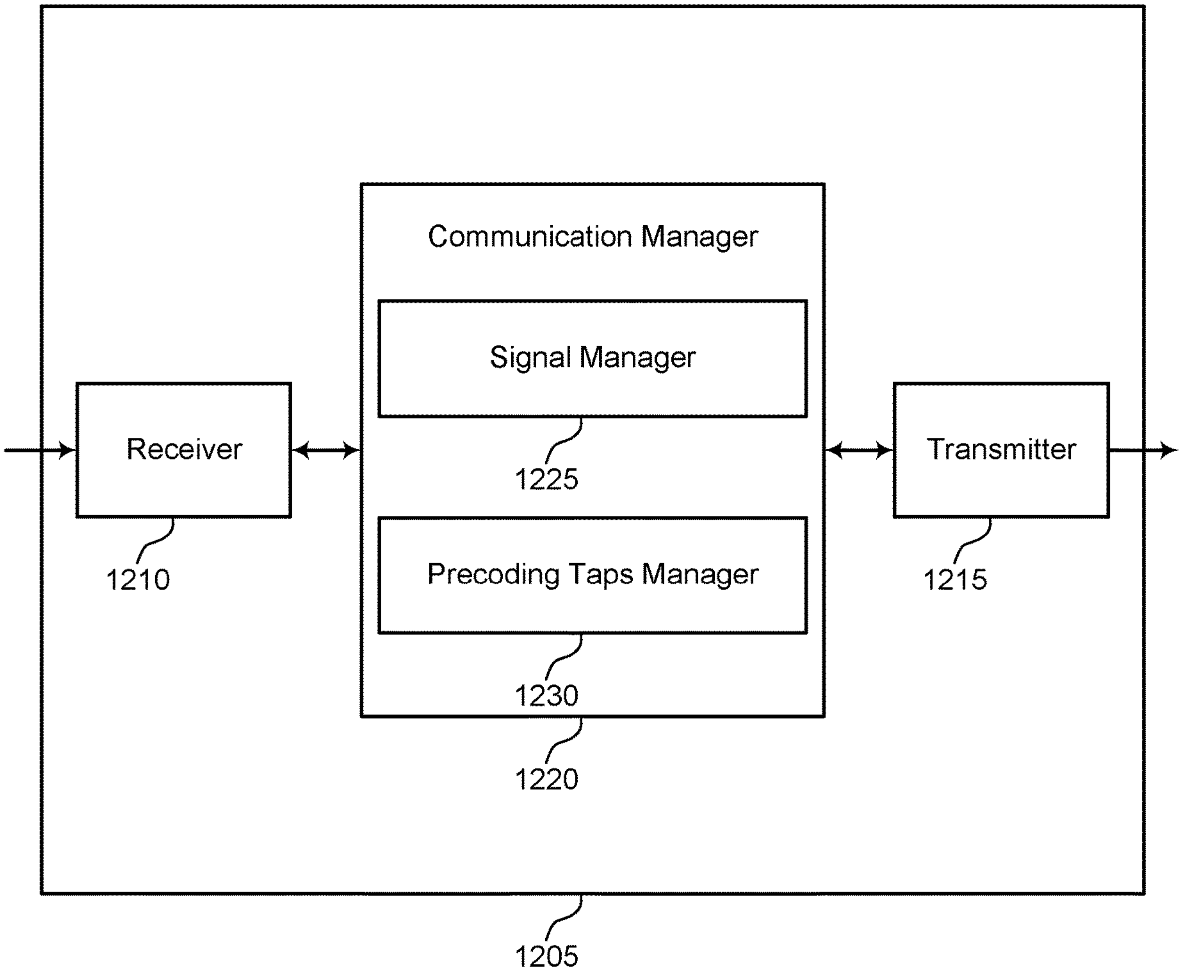

FIG. 12 shows a block diagram of a device 1205 that supports shortened time domain precoding filters for multi-antenna precoding in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one of more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of shortened time domain precoding filters for multi-antenna precoding as described herein. For example, the communications manager 1220 may include a signal manager 1225 a precoding taps manager 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. The signal manager 1225 is capable of, configured to, or operable to support a means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The precoding taps manager 1230 is capable of, configured to, or operable to support a means for transmitting the signal in accordance with the precoding via the set of subcarriers.

Figure 13:
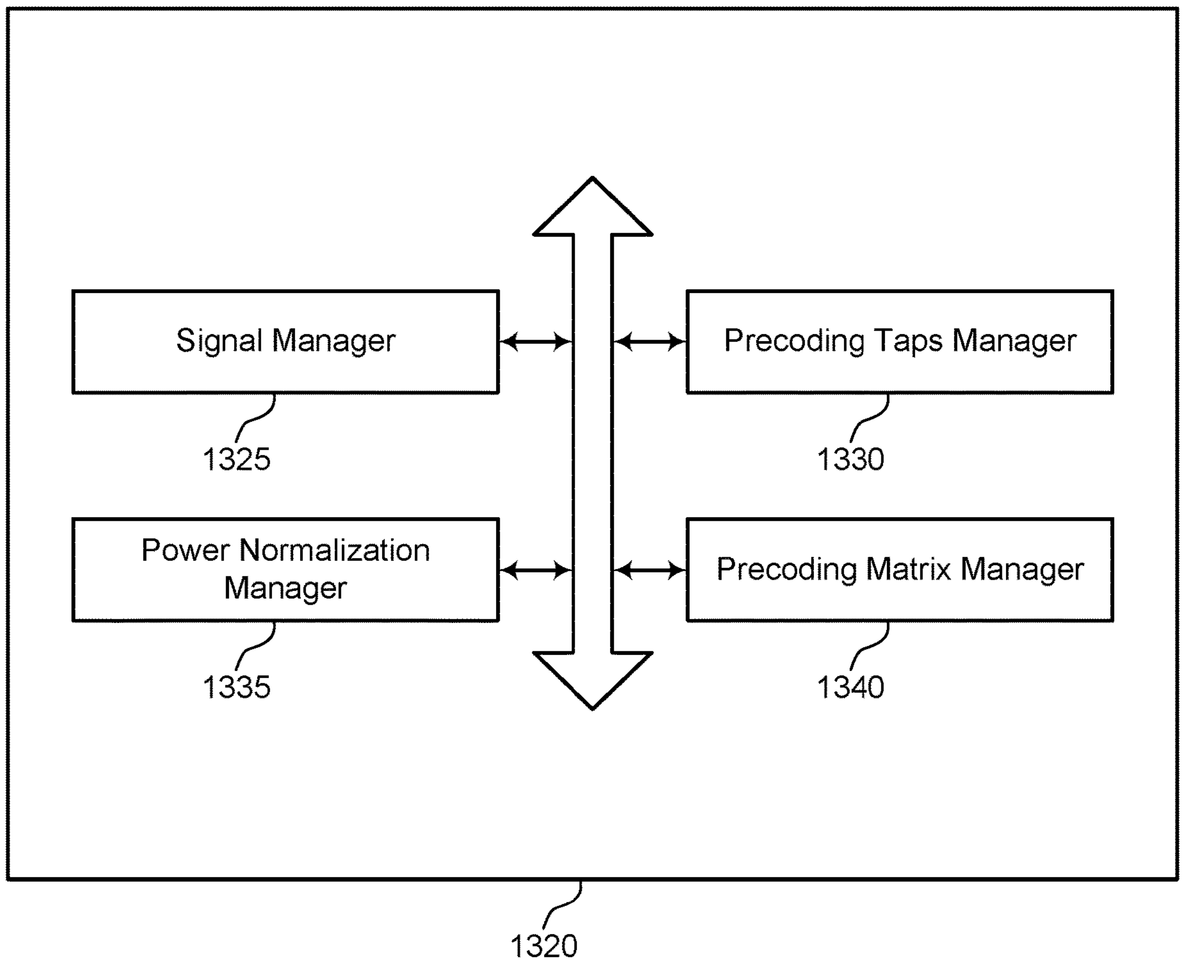
FIG. 13 shows a block diagram of a communication manager that supports shortened time domain precoding filters for multi-antenna precoding in accordance with one or more aspects of the present disclosure.

FIG. 13 shows a block diagram of a communications manager 1320 that supports shortened time domain precoding filters for multi-antenna precoding in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of shortened time domain precoding filters for multi-antenna precoding as described herein. For example, the communications manager 1320 may include a signal manager 1325, a precoding taps manager 1330, a power normalization manager 1335, a precoding matrix manager 1340, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication in accordance with examples as disclosed herein. The signal manager 1325 is capable of, configured to, or operable to support a means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The precoding taps manager 1330 is capable of, configured to, or operable to support a means for transmitting the signal in accordance with the precoding via the set of subcarriers.

In some examples, the power normalization manager 1335 is capable of, configured to, or operable to support a means for selecting one or more scaling factors associated with a power normalization of the set of subcarriers, the one or more scaling factors being associated with the subset of time domain precoding taps. In some examples, the power normalization manager 1335 is capable of, configured to, or operable to support a means for performing the power normalization of the set of subcarriers in accordance with the one or more scaling factors.

In some examples, to support precoding the signal, the precoding matrix manager 1340 is capable of, configured to, or operable to support a means for precoding the signal in accordance with a precoding matrix that is associated with the subset of time domain precoding taps.

In some examples, the precoding matrix manager 1340 is capable of, configured to, or operable to support a means for receiving an indication of a precoding matrix associated with the set of time domain precoding taps. In some examples, the precoding matrix manager 1340 is capable of, configured to, or operable to support a means for selecting a subset of the precoding matrix associated with the subset of time domain precoding taps, the precoding of the signal being in accordance with the subset of the precoding matrix.

In some examples, to support transmitting the indication of the precoding matrix, the precoding matrix manager 1340 is capable of, configured to, or operable to support a means for receiving a channel state information report that indicates the precoding matrix.

In some examples, the channel state information report includes an enhanced Type-2 channel state information codebook that indicates the precoding matrix.

Figure 14:
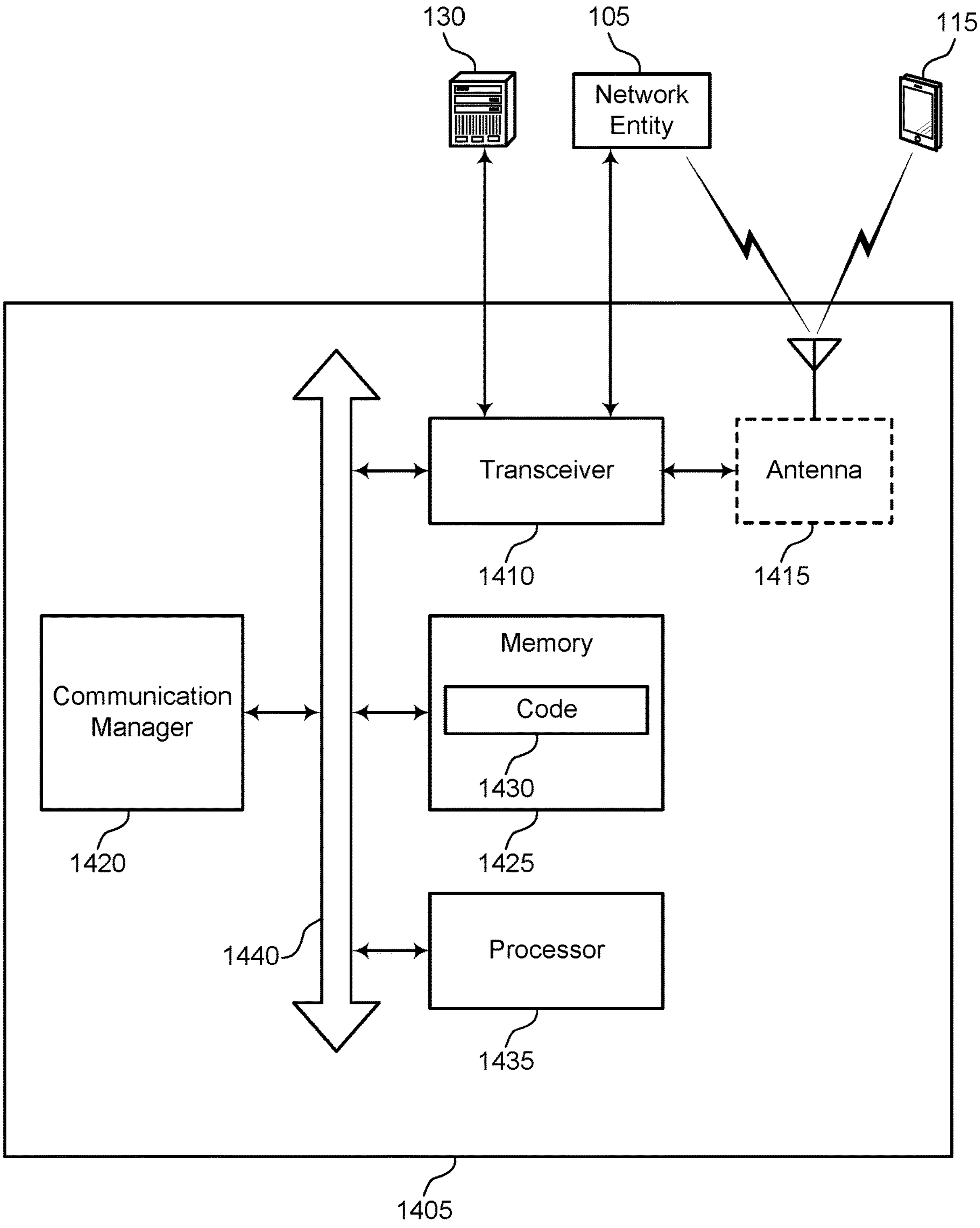
FIG. 14 shows a diagram of a system including a device that supports shortened time domain precoding filters for multi-antenna precoding in accordance with one or more aspects of the present disclosure.

FIG. 14 shows a diagram of a system including a device 1405 that supports shortened time domain precoding filters for multi-antenna precoding in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting shortened time domain precoding filters for multi-antenna precoding). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. As such, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication in accordance with examples as disclosed herein. For example, the communications manager 1420 is capable of, configured to, or operable to support a means for precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The communications manager 1420 is capable of, configured to, or operable to support a means for transmitting the signal in accordance with the precoding via the set of subcarriers.

By including or configuring the communications manager 1420 in accordance with examples as described herein, the device 1405 may support techniques for increased throughput, reduced encoding and decoding complexity, reduced transmitter and receiver complexity, higher spectrum efficiency, reduced power consumption, longer battery life, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of shortened time domain precoding filters for multi-antenna precoding as described herein, or the at least one processor 1435 and the at least one memory 1425 may be otherwise configured to, individually or collectively, perform or support such operations.

Figure 15:
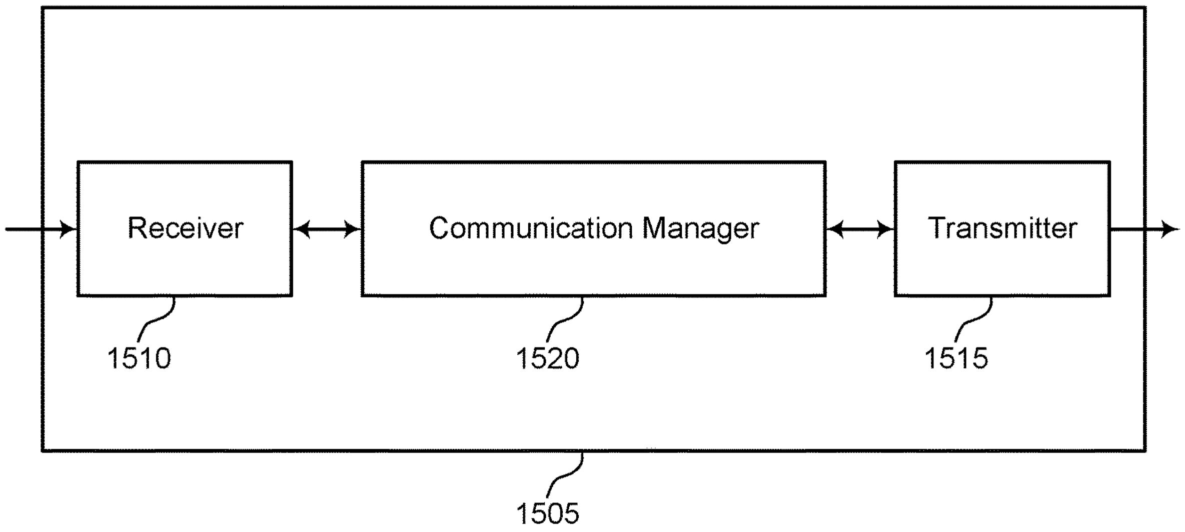
FIGS. 15 and 16 show block diagrams of devices that support shortened time domain precoding filters for multi-antenna precoding in accordance with one or more aspects of the present disclosure.

FIG. 15 shows a block diagram of a device 1505 that supports shortened time domain precoding filters for multi-antenna precoding in accordance with one or more aspects of the present disclosure. The device 1505 may be an example of aspects of a transmitter as described herein. The device 1505 may include a receiver 1510, a transmitter 1515, and a communications manager 1520. The device 1505, or one or more components of the device 1505 (e.g., the receiver 1510, the transmitter 1515, and the communications manager 1520), may include at least one processor, which may be coupled with at least one memory, to, individually or collectively, support or enable the described techniques. Each of these components may be in communication with one another (e.g., via one or more buses).

The receiver 1510 may provide a means for receiving information such as packets, user data, control information, or any combination thereof associated with various information channels (e.g., control channels, data channels, information channels related to shortened time domain precoding filters for multi-antenna precoding). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to shortened time domain precoding filters for multi-antenna precoding). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of shortened time domain precoding filters for multi-antenna precoding as described herein. For example, the communications manager 1520, the receiver 1510, the transmitter 1515, or various combinations or components thereof may be capable of performing one or more of the functions described herein.

In some examples, the communications manager 1520, the receiver 1510, the transmitter 1515, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1520, the receiver 1510, the transmitter 1515, or various combinations or components thereof may be implemented in code (e.g., as communications management software or firmware) executed by at least one processor. If implemented in code executed by at least one processor, the functions of the communications manager 1520, the receiver 1510, the transmitter 1515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1520 may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication in accordance with examples as disclosed herein. For example, the communications manager 1520 is capable of, configured to, or operable to support a means for selecting, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The communications manager 1520 is capable of, configured to, or operable to support a means for transmitting a signal in accordance with the selected transmit channel shortener via the set of subcarriers of the channel.

By including or configuring the communications manager 1520 in accordance with examples as described herein, the device 1505 (e.g., at least one processor controlling or otherwise coupled with the receiver 1510, the transmitter 1515, the communications manager 1520, or a combination thereof) may support techniques for reduced processing, reduced power consumption, reduced PAPR, and reduced decoding complexity.

Figure 16:
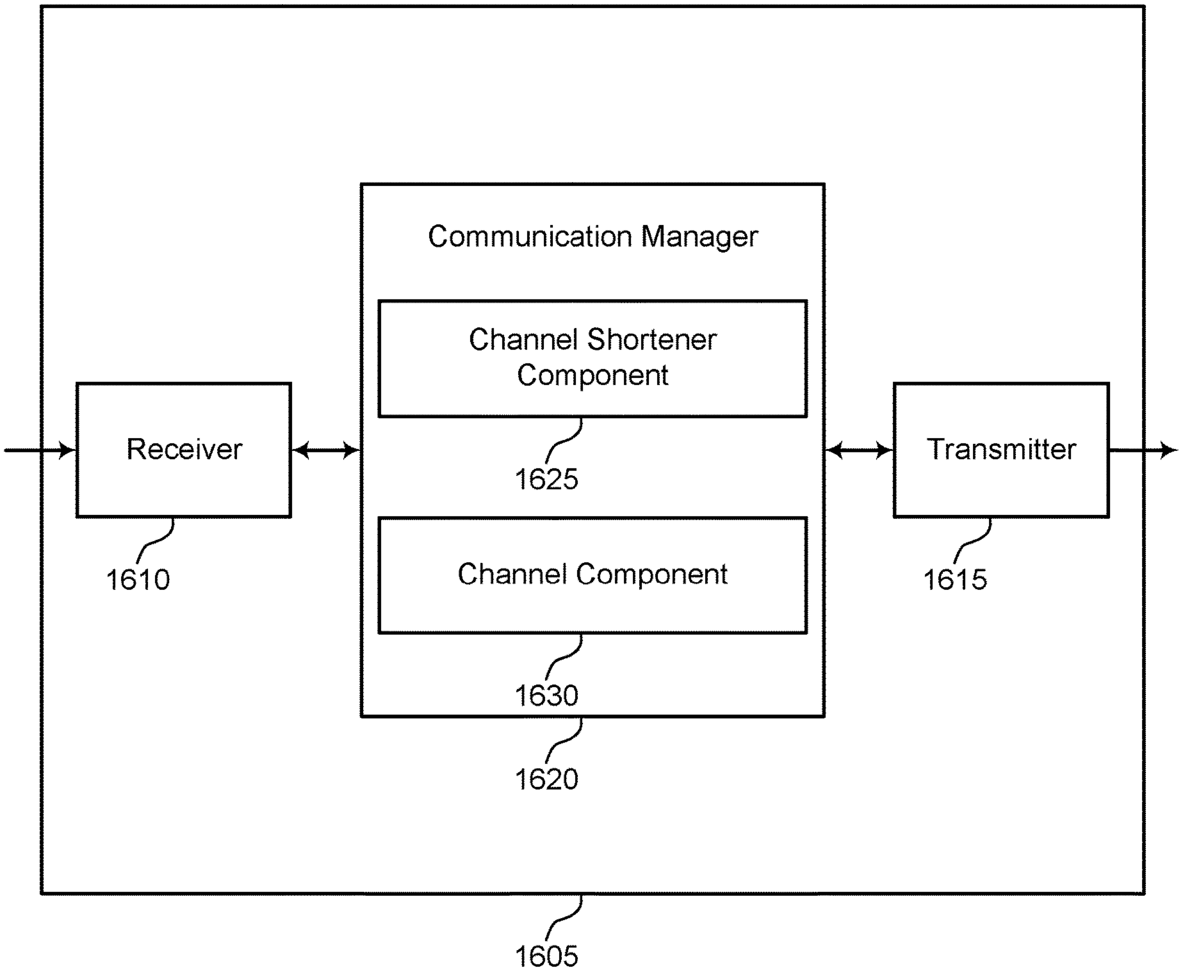

FIG. 16 shows a block diagram of a device 1605 that supports shortened time domain precoding filters for multi-antenna precoding in accordance with one or more aspects of the present disclosure. The device 1605 may be an example of aspects of a device 1505 or a transmitter 115 as described herein. The device 1605 may include a receiver 1610, a transmitter 1615, and a communications manager 1620. The device 1605, or one of more components of the device 1605 (e.g., the receiver 1610, the transmitter 1615, and the communications manager 1620), may include at least one processor, which may be coupled with at least one memory, to support the described techniques. Each of these components may be in communication with one another (e.g., via one or more buses).

The receiver 1610 may provide a means for receiving information such as packets, user data, control information, or any combination thereof associated with various information channels (e.g., control channels, data channels, information channels related to shortened time domain precoding filters for multi-antenna precoding). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to shortened time domain precoding filters for multi-antenna precoding). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of shortened time domain precoding filters for multi-antenna precoding as described herein. For example, the communications manager 1620 may include a channel shortener component 1625 a channel component 1630, or any combination thereof. The communications manager 1620 may be an example of aspects of a communications manager 1520 as described herein. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communication in accordance with examples as disclosed herein. The channel shortener component 1625 is capable of, configured to, or operable to support a means for selecting, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The channel component 1630 is capable of, configured to, or operable to support a means for transmitting a signal in accordance with the selected transmit channel shortener via the set of subcarriers of the channel.

Figure 17:
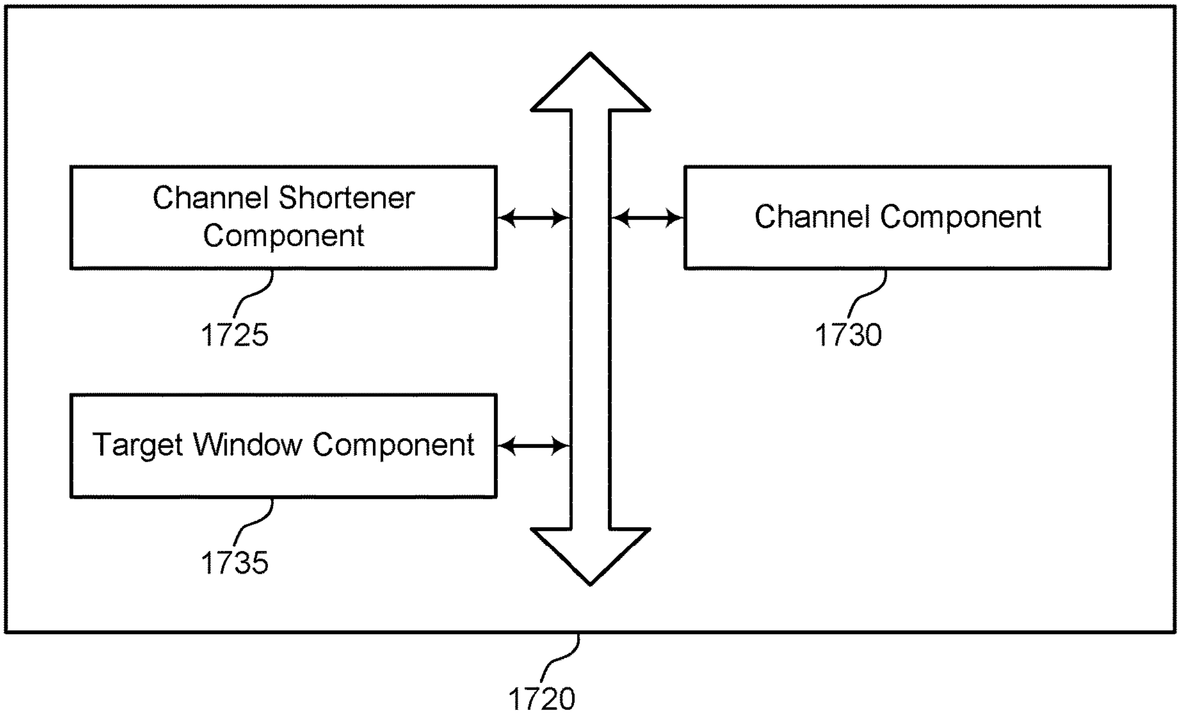
FIG. 17 shows a block diagram of a communication manager that supports shortened time domain precoding filters for multi-antenna precoding in accordance with one or more aspects of the present disclosure.

FIG. 17 shows a block diagram of a communications manager 1720 that supports shortened time domain precoding filters for multi-antenna precoding in accordance with one or more aspects of the present disclosure. The communications manager 1720 may be an example of aspects of a communications manager 1520, a communications manager 1620, or both, as described herein. The communications manager 1720, or various components thereof, may be an example of means for performing various aspects of shortened time domain precoding filters for multi-antenna precoding as described herein. For example, the communications manager 1720 may include a channel shortener component 1725, a channel component 1730, a target window component 1735, or any combination thereof. Each of these components, or components or subcomponents thereof (e.g., one or more processors, one or more memories), may communicate, directly or indirectly, with one another (e.g., via one or more buses).

The communications manager 1720 may support wireless communication in accordance with examples as disclosed herein. The channel shortener component 1725 is capable of, configured to, or operable to support a means for selecting, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The channel component 1730 is capable of, configured to, or operable to support a means for transmitting a signal in accordance with the selected transmit channel shortener via the set of subcarriers of the channel.

In some examples, to support transmitting the signal, the channel component 1730 is capable of, configured to, or operable to support a means for transmitting the signal via a second channel, the second channel including the channel and the transmit channel shortener.

In some examples, a length of the second channel is shorter than a length of the channel in accordance with the transmit channel shortener.

In some examples, to support transmitting signal via the second channel, the channel component 1730 is capable of, configured to, or operable to support a means for performing a convolution of the selected transmit channel shortener with a channel matrix in a time domain, the channel matrix corresponding to a set of time domain channel taps associated with the set of subcarriers.

In some examples, to support selecting the transmit channel shortener, the target window component 1735 is capable of, configured to, or operable to support a means for generating a diagonal matrix that is indicative of a time delay and a target window length of a target window associated with the selected transmit channel shortener.

In some examples, to support selecting the transmit channel shortener, the target window component 1735 is capable of, configured to, or operable to support a means for calculating the channel energy associated with the transmit channel shortener in accordance with the diagonal matrix.

In some examples, the channel component 1730 is capable of, configured to, or operable to support a means for precoding the signal in accordance with a channel state information report that includes an enhanced Type-2 channel state information codebook.

Figure 18:
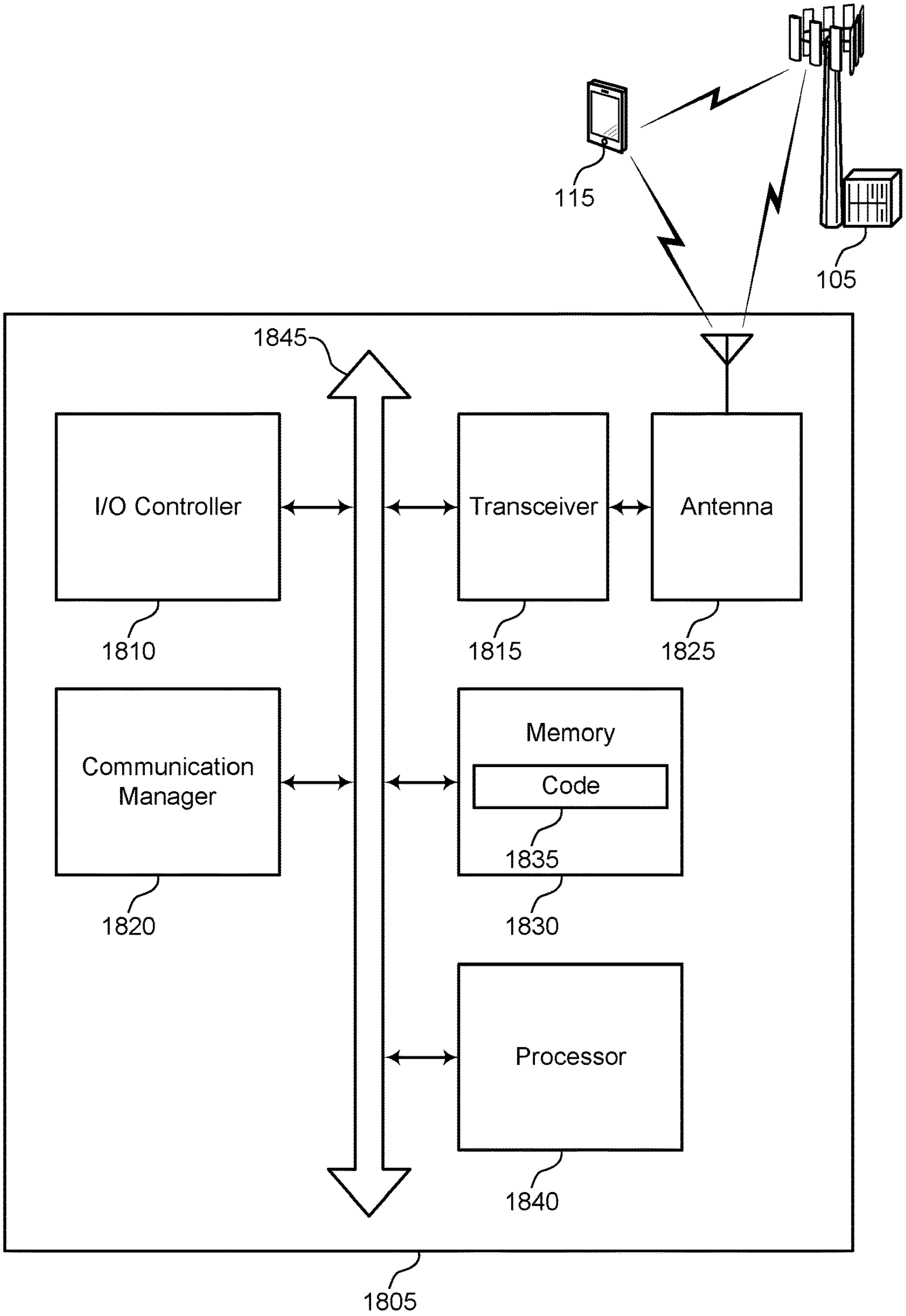
FIG. 18 shows a diagram of a system including a device that supports shortened time domain precoding filters for multi-antenna precoding in accordance with one or more aspects of the present disclosure.

FIG. 18 shows a diagram of a system including a device 1805 that supports shortened time domain precoding filters for multi-antenna precoding in accordance with one or more aspects of the present disclosure. The device 1805 may be an example of or include the components of a device 1505, a device 1605, or a transmitter as described herein. The device 1805 may include components for bi-directional voice and data communications including components for transmitting and receiving communications, such as a communications manager 1820, an I/O controller 1810, a transceiver 1815, an antenna 1825, at least one memory 1830, code 1835, and at least one processor 1840. These components may be in electronic communication or otherwise coupled (e.g., operatively, communicatively, functionally, electronically, electrically) via one or more buses (e.g., a bus 1845).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. Additionally or alternatively, the I/O controller 1810 may represent or interact with a modem, a keyboard, a mouse, a touchscreen, or a similar device. In some cases, the I/O controller 1810 may be implemented as part of one or more processors, such as the at least one processor 1840. In some cases, a user may interact with the device 1805 via the I/O controller 1810 or via hardware components controlled by the I/O controller 1810.

In some cases, the device 1805 may include a single antenna 1825. However, in some other cases, the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The at least one memory 1830 may include RAM and ROM. The at least one memory 1830 may store computer-readable, computer-executable code 1835 including instructions that, when executed by the at least one processor 1840, cause the device 1805 to perform various functions described herein. The code 1835 may be stored in a non-transitory computer-readable medium such as system memory or another type of memory. In some cases, the code 1835 may not be directly executable by the at least one processor 1840 but may cause a computer (e.g., when compiled and executed) to perform functions described herein. In some cases, the at least one memory 1830 may contain, among other things, a BIOS which may control basic hardware or software operation such as the interaction with peripheral components or devices.

The at least one processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1840 may be configured to operate a memory array using a memory controller. In some other cases, a memory controller may be integrated into the at least one processor 1840. The at least one processor 1840 may be configured to execute computer-readable instructions stored in a memory (e.g., the at least one memory 1830) to cause the device 1805 to perform various functions (e.g., functions or tasks supporting shortened time domain precoding filters for multi-antenna precoding). For example, the device 1805 or a component of the device 1805 may include at least one processor 1840 and at least one memory 1830 coupled with or to the at least one processor 1840, the at least one processor 1840 and at least one memory 1830 configured to perform various functions described herein. In some examples, the at least one processor 1840 may include multiple processors and the at least one memory 1830 may include multiple memories. One or more of the multiple processors may be coupled with one or more of the multiple memories, which may, individually or collectively, be configured to perform various functions herein. In some examples, the at least one processor 1840 may be a component of a processing system, which may refer to a system (such as a series) of machines, circuitry (including, for example, one or both of processor circuitry (which may include the at least one processor 1840) and memory circuitry (which may include the at least one memory 1830)), or components, that receives or obtains inputs and processes the inputs to produce, generate, or obtain a set of outputs. The processing system may be configured to perform one or more of the functions described herein. As such, the at least one processor 1840 or a processing system including the at least one processor 1840 may be configured to, configurable to, or operable to cause the device 1805 to perform one or more of the functions described herein. Further, as described herein, being "configured to," being "configurable to," and being "operable to" may be used interchangeably and may be associated with a capability, when executing code stored in the at least one memory 1830 or otherwise, to perform one or more of the functions described herein.

The communications manager 1820 may support wireless communication in accordance with examples as disclosed herein. For example, the communications manager 1820 is capable of, configured to, or operable to support a means for selecting, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The communications manager 1820 is capable of, configured to, or operable to support a means for transmitting a signal in accordance with the selected transmit channel shortener via the set of subcarriers of the channel.

By including or configuring the communications manager 1820 in accordance with examples as described herein, the device 1805 may support techniques for increased throughput, reduced encoding and decoding complexity, reduced transmitter and receiver complexity, higher spectrum efficiency, reduced power consumption, longer battery life, and improved utilization of processing capability.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the at least one processor 1840, the at least one memory 1830, the code 1835, or any combination thereof. For example, the code 1835 may include instructions executable by the at least one processor 1840 to cause the device 1805 to perform various aspects of shortened time domain precoding filters for multi-antenna precoding as described herein, or the at least one processor 1840 and the at least one memory 1830 may be otherwise configured to, individually or collectively, perform or support such operations.

Figure 19:
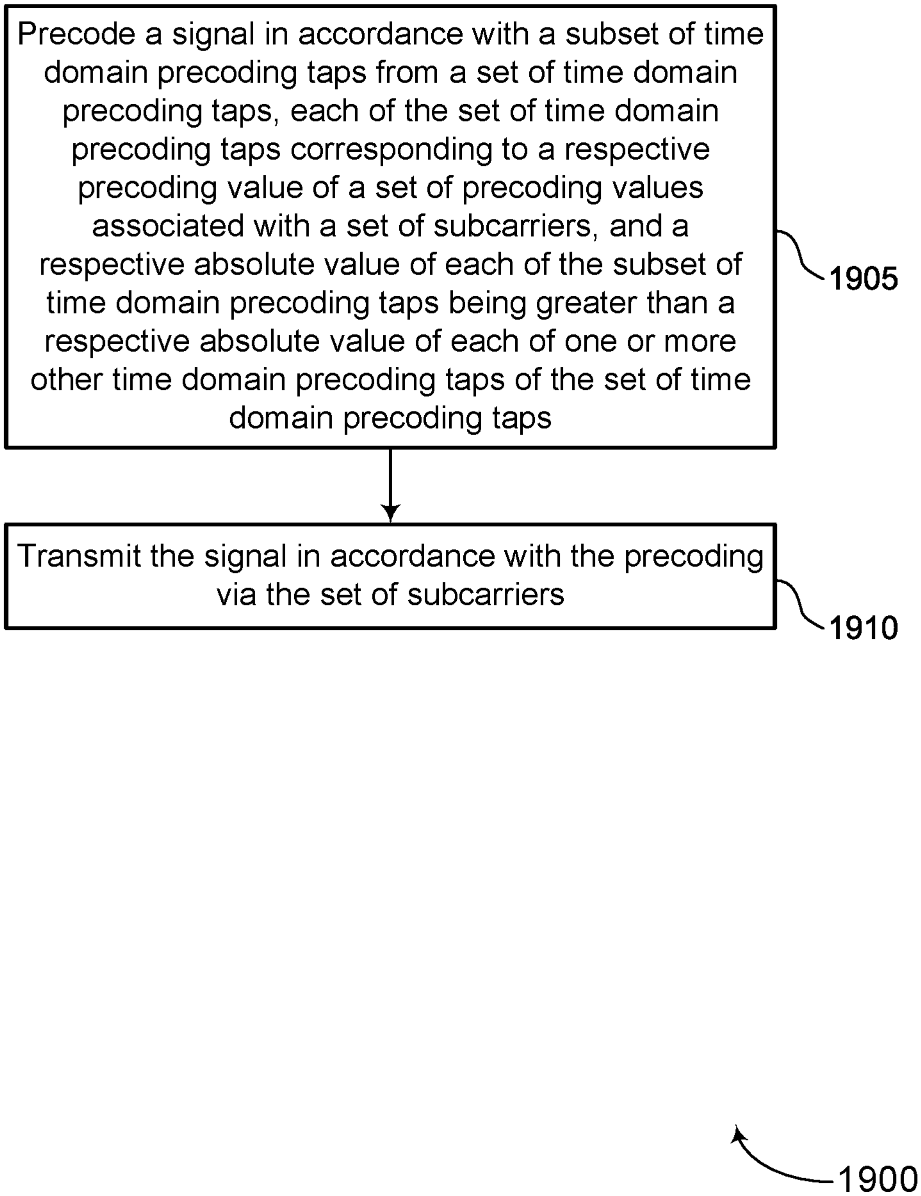
FIGS. 19-26 show flowcharts illustrating methods that support shortened time domain precoding filters for multi-antenna precoding in accordance with one or more aspects of the present disclosure.

FIG. 19 shows a flowchart illustrating a method 1900 that supports shortened time domain precoding filters for multi-antenna precoding in accordance with aspects of the present disclosure. The operations of the method 1900 may be implemented by a UE or its components as described herein. For example, the operations of the method 1900 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1905, the method may include precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The operations of block 1905 may be performed in accordance with examples as disclosed herein. In some examples, aspects of the operations of 1905 may be performed by a precoding taps component 925 as described with reference to FIG. 9.

At 1910, the method may include transmitting the signal in accordance with the precoding via the set of subcarriers. The operations of block 1910 may be performed in accordance with examples as disclosed herein. In some examples, aspects of the operations of 1910 may be performed by a signal component 930 as described with reference to FIG. 9.

Figure 20:
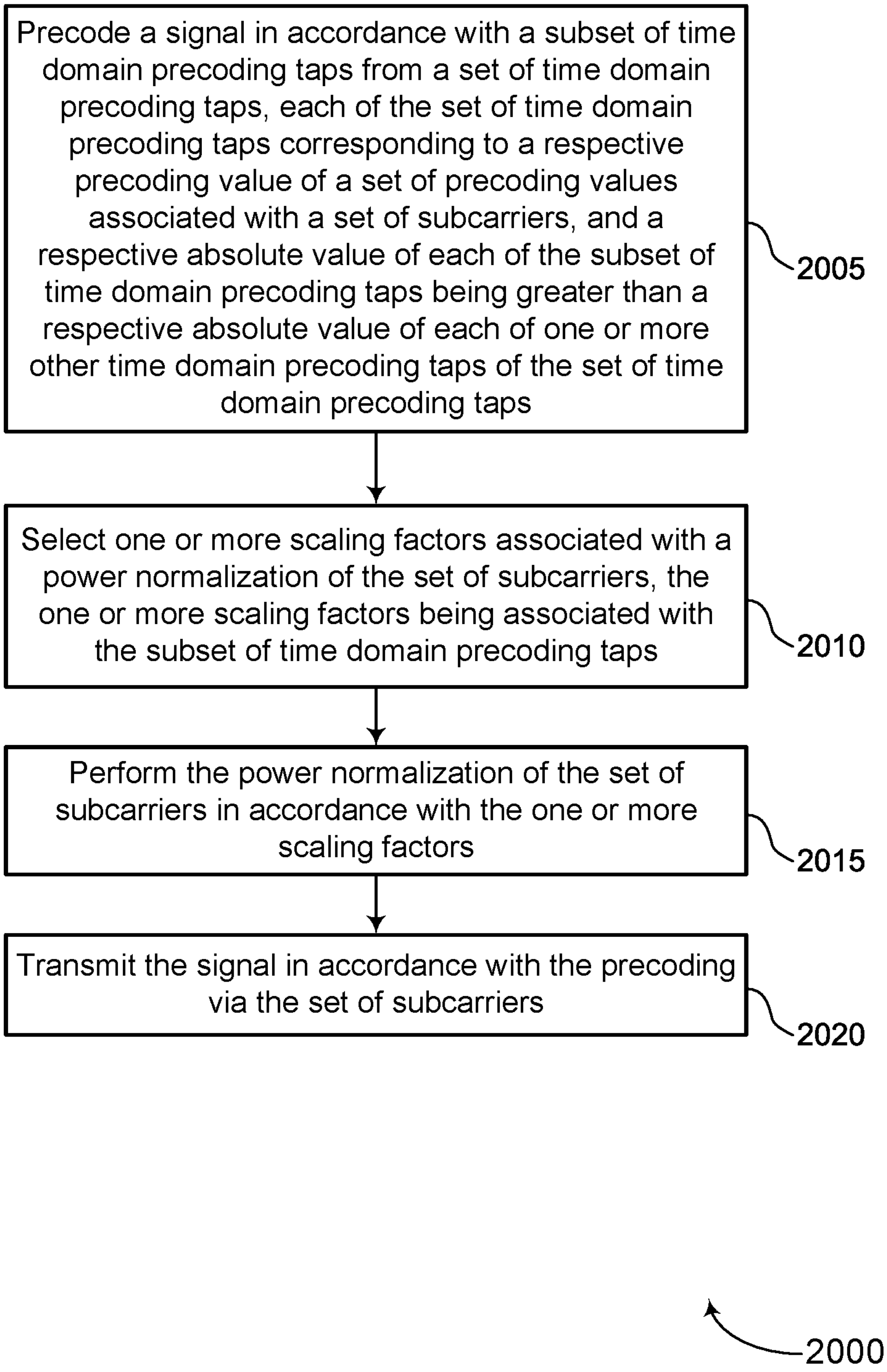

FIG. 20 shows a flowchart illustrating a method 2000 that supports shortened time domain precoding filters for multi-antenna precoding in accordance with aspects of the present disclosure. The operations of the method 2000 may be implemented by a UE or its components as described herein. For example, the operations of the method 2000 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 2005, the method may include precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The operations of block 2005 may be performed in accordance with examples as disclosed herein. In some examples, aspects of the operations of 2005 may be performed by a precoding taps component 925 as described with reference to FIG. 9.

At 2010, the method may include selecting one or more scaling factors associated with a power normalization of the set of subcarriers, the one or more scaling factors being associated with the subset of time domain precoding taps. The operations of block 2010 may be performed in accordance with examples as disclosed herein. In some examples, aspects of the operations of 2010 may be performed by a power normalization component 935 as described with reference to FIG. 9.

At 2015, the method may include performing the power normalization of the set of subcarriers in accordance with the one or more scaling factors. The operations of block 2015 may be performed in accordance with examples as disclosed herein. In some examples, aspects of the operations of 2015 may be performed by a power normalization component 935 as described with reference to FIG. 9.

At 2020, the method may include transmitting the signal in accordance with the precoding via the set of subcarriers. The operations of block 2020 may be performed in accordance with examples as disclosed herein. In some examples, aspects of the operations of 2020 may be performed by a signal component 930 as described with reference to FIG. 9.

Figure 21:
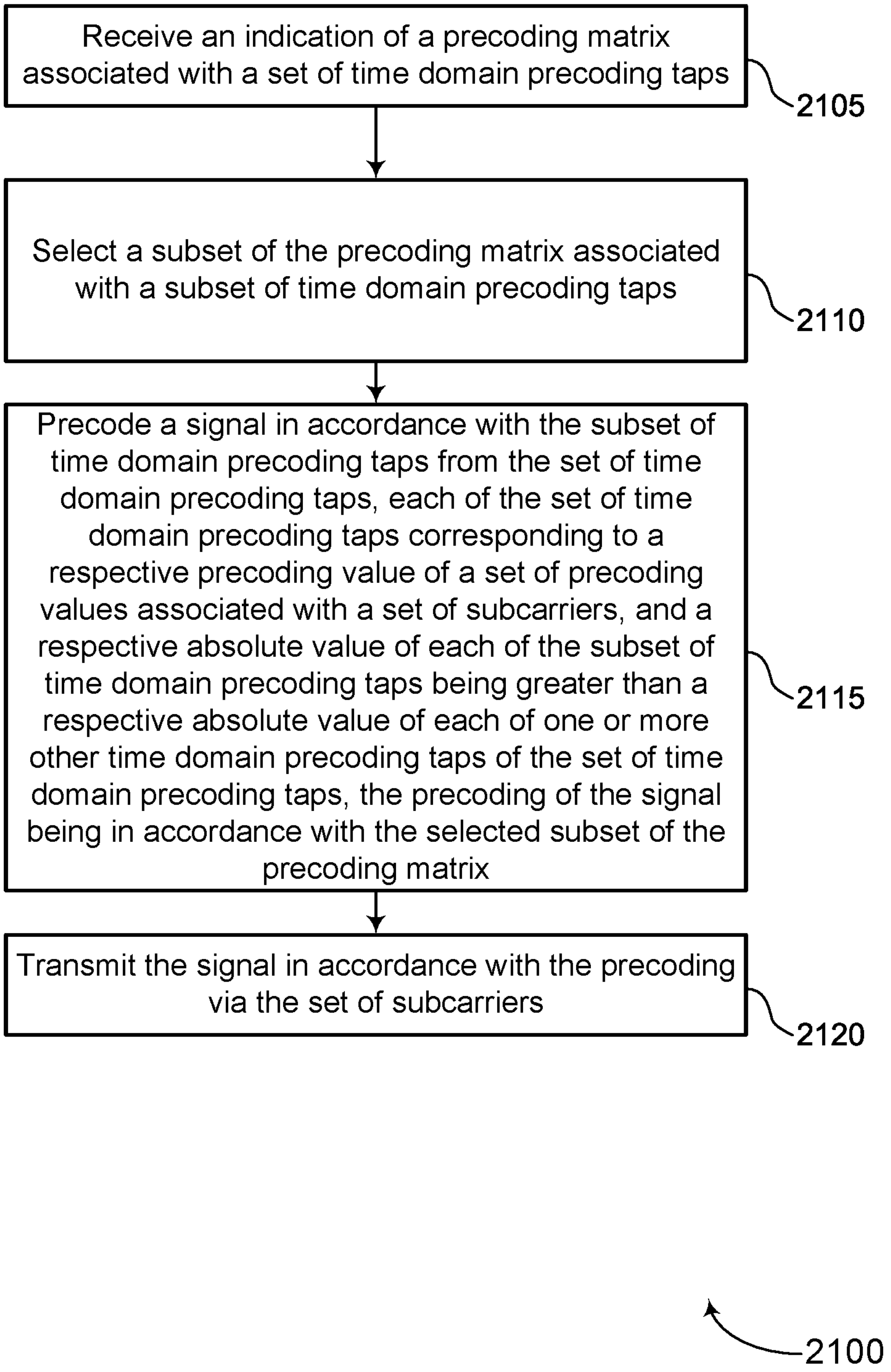

FIG. 21 shows a flowchart illustrating a method 2100 that supports shortened time domain precoding filters for multi-antenna precoding in accordance with aspects of the present disclosure. The operations of the method 2100 may be implemented by a UE or its components as described herein. For example, the operations of the method 2100 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 2105, the method may include receiving an indication of a precoding matrix associated with a set of time domain precoding taps. The operations of block 2105 may be performed in accordance with examples as disclosed herein. In some examples, aspects of the operations of 2105 may be performed by a precoding matrix component 940 as described with reference to FIG. 9.

At 2110, the method may include selecting a subset of the precoding matrix associated with the subset of time domain precoding taps. The operations of block 2110 may be performed in accordance with examples as disclosed herein. In some examples, aspects of the operations of 2110 may be performed by a precoding matrix component 940 as described with reference to FIG. 9.

At 2115, the method may include precoding a signal in accordance with the subset of time domain precoding taps from the set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps, the precoding of the signal being in accordance with the selected subset of the precoding matrix. The operations of block 2115 may be performed in accordance with examples as disclosed herein. In some examples, aspects of the operations of 2115 may be performed by a precoding taps component 925 as described with reference to FIG. 9.

At 2120, the method may include transmitting the signal in accordance with the precoding via the set of subcarriers. The operations of block 2120 may be performed in accordance with examples as disclosed herein. In some examples, aspects of the operations of 2120 may be performed by a signal component 930 as described with reference to FIG. 9.

Figure 22:
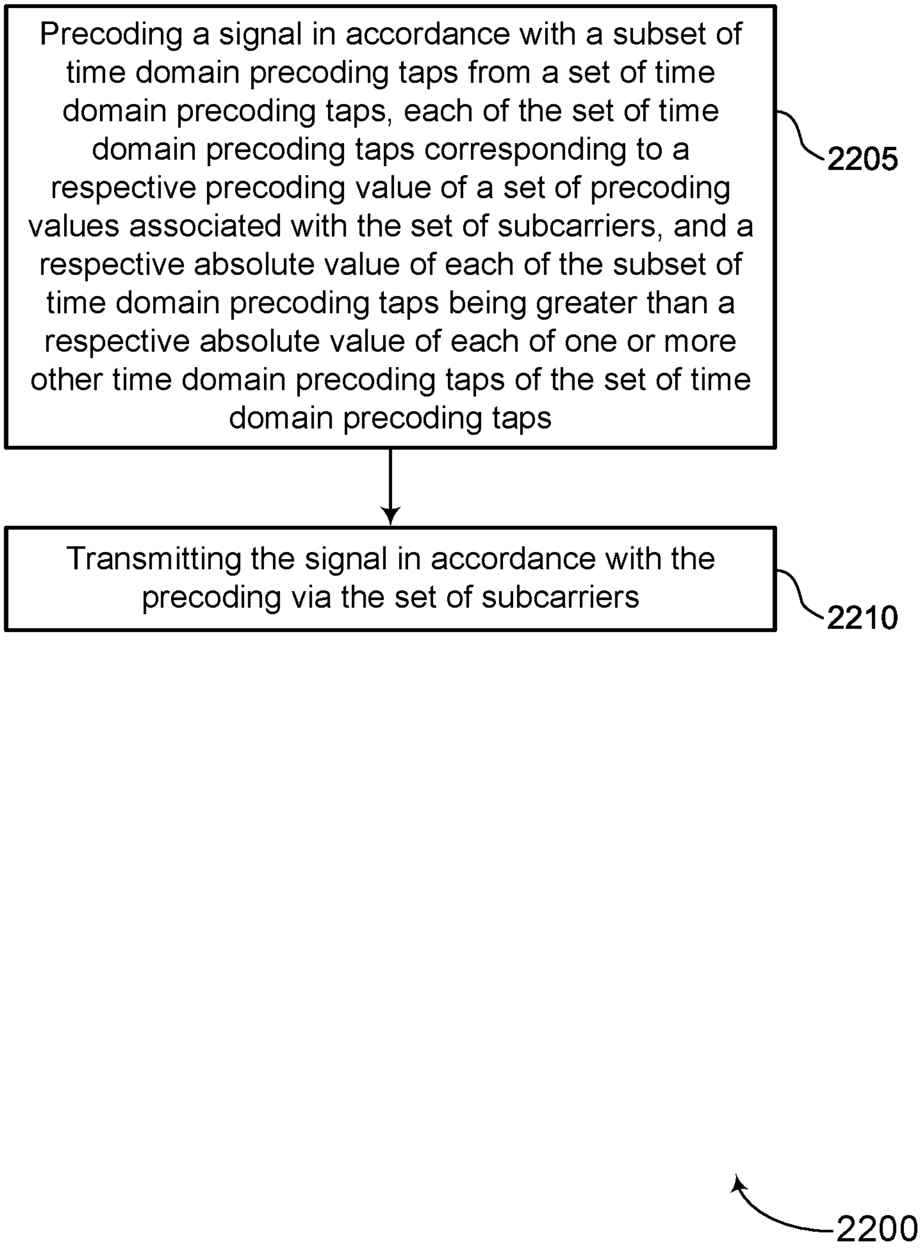

FIG. 22 shows a flowchart illustrating a method 2200 that supports shortened time domain precoding filters for multi-antenna precoding in accordance with aspects of the present disclosure. The operations of the method 2200 may be implemented by a network entity or its components as described herein. For example, the operations of the method 2200 may be performed by a network entity as described with reference to FIGS. 1-6 and 11-14. In some examples, a network entity may execute a set of instructions to control the functional elements of the network entity to perform the described functions. Additionally, or alternatively, the network entity may perform aspects of the described functions using special-purpose hardware.

At 2205, the method may include precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps. The operations of block 2205 may be performed in accordance with examples as disclosed herein. In some examples, aspects of the operations of 2205 may be performed by a signal manager 1325 as described with reference to FIG. 13.

At 2210, the method may include transmitting the signal in accordance with the precoding via the set of subcarriers. The operations of block 2210 may be performed in accordance with examples as disclosed herein. In some examples, aspects of the operations of 2210 may be performed by a precoding taps manager 1330 as described with reference to FIG. 13.

Figure 23:
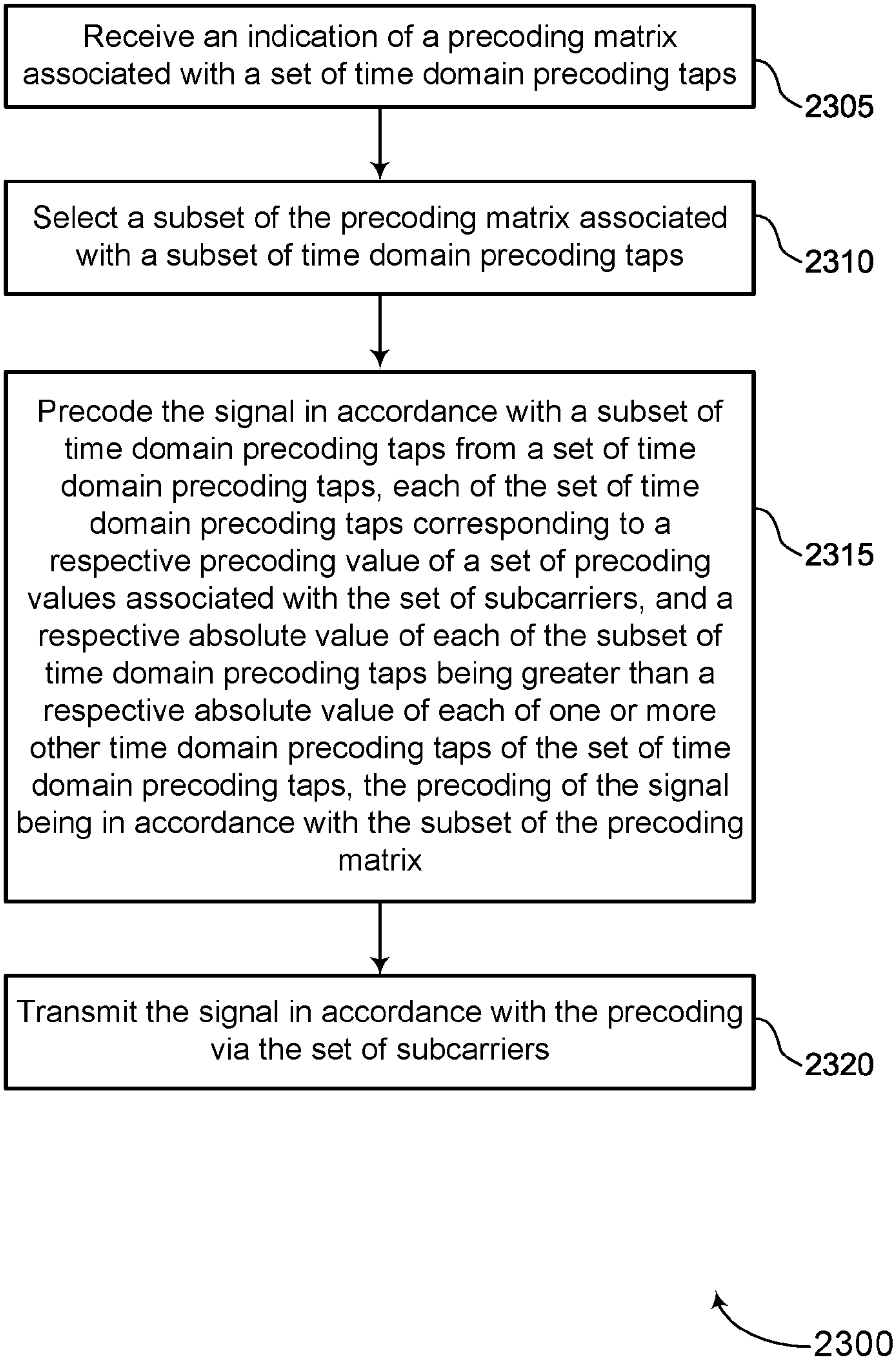

FIG. 23 shows a flowchart illustrating a method 2300 that supports shortened time domain precoding filters for multi-antenna precoding in accordance with aspects of the present disclosure. The operations of the method 2300 may be implemented by a network entity or its components as described herein. For example, the operations of the method 2300 may be performed by a network entity as described with reference to FIGS. 1-6 and 11-14. In some examples, a network entity may execute a set of instructions to control the functional elements of the network entity to perform the described functions. Additionally, or alternatively, the network entity may perform aspects of the described functions using special-purpose hardware.

At 2305, the method may include receiving an indication of a precoding matrix associated with a set of time domain precoding taps. The operations of block 2305 may be performed in accordance with examples as disclosed herein. In some examples, aspects of the operations of 2305 may be performed by a precoding matrix manager 1335 as described with reference to FIG. 13.

At 2310, the method may include selecting a subset of the precoding matrix associated with a subset of time domain precoding taps. The operations of block 2310 may be performed in accordance with examples as disclosed herein. In some examples, aspects of the operations of 2310 may be performed by a precoding matrix manager 1335 as described with reference to FIG. 13.

At 2315, the method may include precoding a signal in accordance with the subset of time domain precoding taps from the set of time domain precoding taps, each of the set of time domain precoding taps corresponding to a respective precoding value of a set of precoding values associated with the set of subcarriers, and a respective absolute value of each of the subset of time domain precoding taps being greater than a respective absolute value of each of one or more other time domain precoding taps of the set of time domain precoding taps, the precoding of the signal being in accordance with the subset of the precoding matrix. The operations of block 2315 may be performed in accordance with examples as disclosed herein. In some examples, aspects of the operations of 2315 may be performed by a precoding taps manager 1330 as described with reference to FIG. 13.

At 2320, the method may include transmitting the signal in accordance with the precoding via the set of subcarriers. The operations of block 2320 may be performed in accordance with examples as disclosed herein. In some examples, aspects of the operations of 2320 may be performed by a precoding taps manager 1330 as described with reference to FIG. 13.

Figure 24:
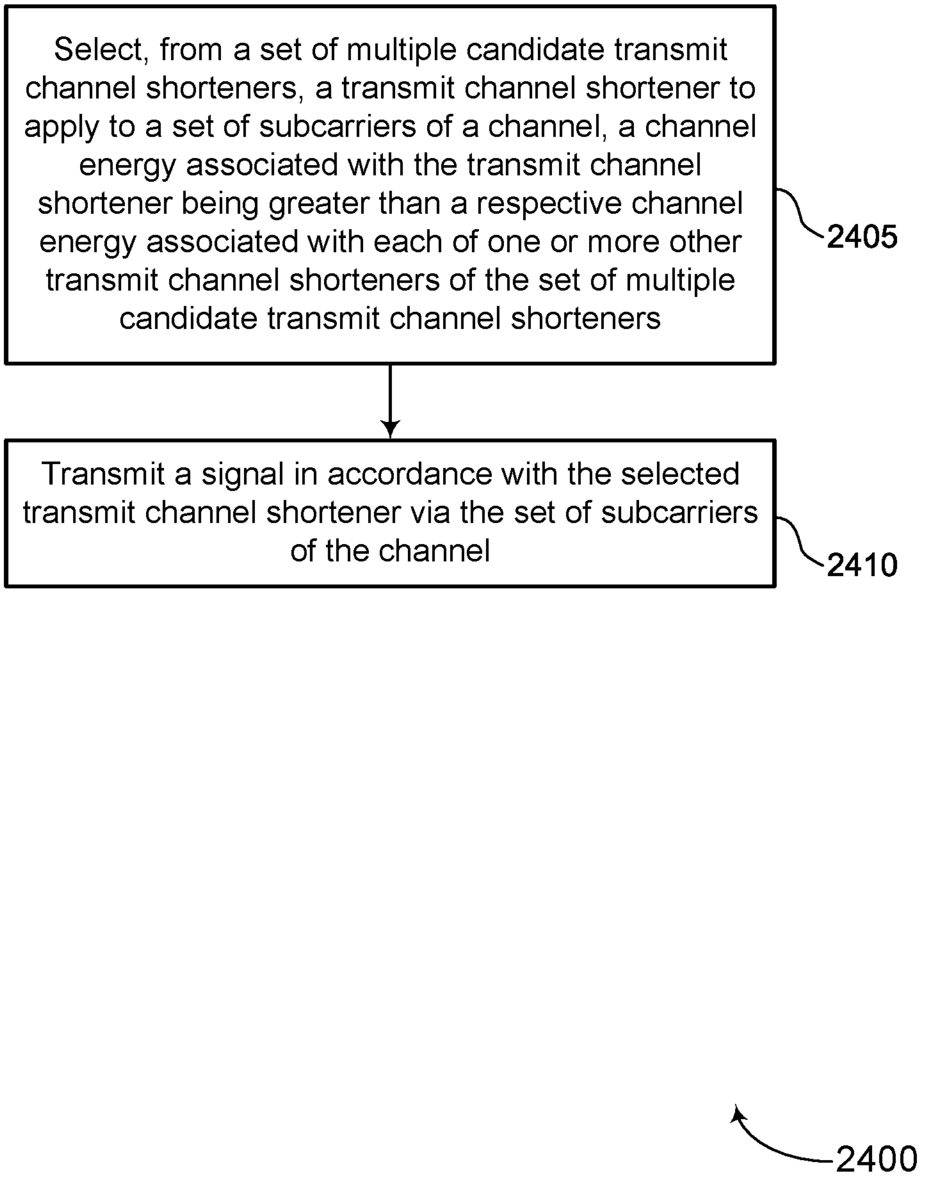

FIG. 24 shows a flowchart illustrating a method 2400 that supports shortened time domain precoding filters for multi-antenna precoding in accordance with aspects of the present disclosure. The operations of the method 2400 may be implemented by a transmitter (for example, a UE 115 or a network entity 105) or its components as described herein. For example, the operations of the method 2400 may be performed by a transmitter as described with reference to FIGS. 1-6 and 15-18. In some examples, a transmitter may execute a set of instructions to control the functional elements of the transmitter to perform the described functions. Additionally, or alternatively, the transmitter may perform aspects of the described functions using special-purpose hardware.

At 2405, the method may include selecting, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The operations of block 2405 may be performed in accordance with examples as disclosed herein. In some examples, aspects of the operations of 2405 may be performed by a channel shortener component 1725 as described with reference to FIG. 17.

At 2410, the method may include transmitting a signal in accordance with the selected transmit channel shortener via the set of subcarriers of the channel. The operations of block 2410 may be performed in accordance with examples as disclosed herein. In some examples, aspects of the operations of 2410 may be performed by a channel component 1730 as described with reference to FIG. 17.

Figure 25:
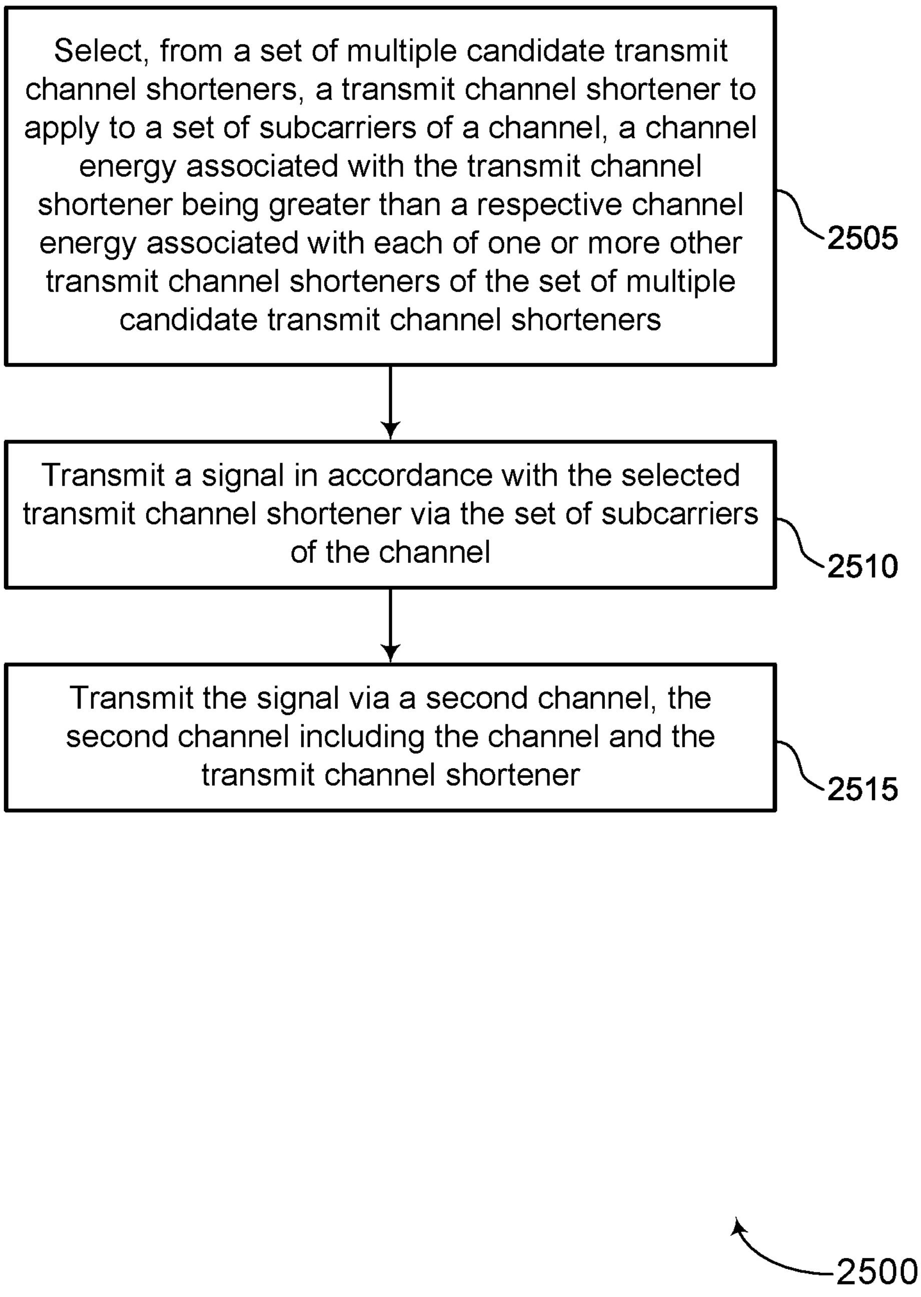

FIG. 25 shows a flowchart illustrating a method 2500 that supports shortened time domain precoding filters for multi-antenna precoding in accordance with aspects of the present disclosure. The operations of the method 2500 may be implemented by a transmitter (for example, a UE 115 or a network entity 105) or its components as described herein. For example, the operations of the method 2500 may be performed by a transmitter as described with reference to FIGS. 1-6 and 15-18. In some examples, a transmitter may execute a set of instructions to control the functional elements of the transmitter to perform the described functions.

Additionally, or alternatively, the transmitter may perform aspects of the described functions using special-purpose hardware.

At 2505, the method may include selecting, from a set of multiple candidate transmit channel shorteners, a transmit channel shortener to apply to a set of subcarriers of a channel, a channel energy associated with the transmit channel shortener being greater than a respective channel energy associated with each of one or more other transmit channel shorteners of the set of multiple candidate transmit channel shorteners. The operations of block 2505 may be performed in accordance with examples as disclosed herein. In some examples, aspects of the operations of 2505 may be performed by a channel shortener component 1725 as described with reference to FIG. 17.

At 2510, the method may include transmitting a signal in accordance with the selected transmit channel shortener via the set of subcarriers of the channel. The operations of block 2510 may be performed in accordance with examples as disclosed herein. In some examples, aspects of the operations of 2510 may be performed by a channel component 1730 as described with reference to FIG. 17.

At 2515, the method may include transmitting the signal via a second channel, the second channel including the channel and the transmit channel shortener. The operations of block 2515 may be performed in accordance with examples as disclosed herein. In some examples, aspects of the operations of 2515 may be performed by a channel component 1730 as described with reference to FIG. 17.

Figure 26:
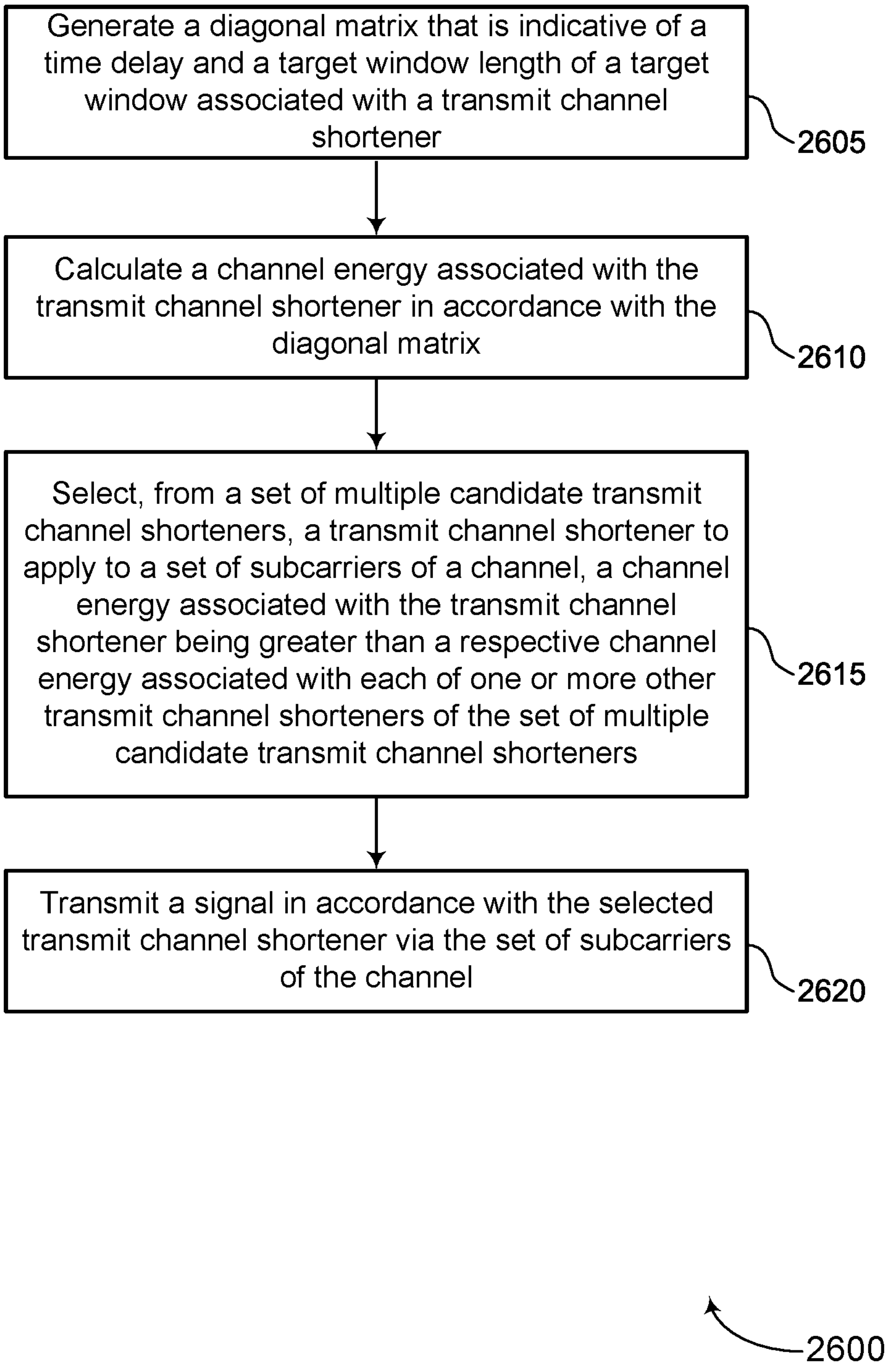

FIG. 26 shows a flowchart illustrating a method 2600 that supports shortened time domain precoding filters for multi-antenna precoding in accordance with aspects of the present disclosure. The operations of the method 2600 may be implemented by a transmitter (for example, a UE 115 or a network entity 105) or its components as described herein. For example, the operations of the method 2600 may be performed by a transmitter as described with reference to FIGS. 1-6 and 15-18. In some examples, a transmitter may execute a set of instructions to control the functional elements of the transmitter to perform the described functions. Additionally, or alternatively, the transmitter may perform aspects of the described functions using special-purpose hardware.

At 2605, the method may include generating a diagonal matrix that is indicative of a time delay and a target window length of a target window associated with a transmit channel shortener. The operations of block 2605 may be performed in accordance with examples as disclosed herein. In some examples, aspects of the operations of 2605 may be performed by a target window component 1735 as described with reference to FIG. 17.

At 2610, the method may include calculating a channel energy associated with the transmit channel shortener in accordance with the diagonal matrix. The operations of block 2610 may be performed in accordance with examples as disclosed herein. In some examples, aspects of the operations of 2610 may be performed by a target window component 1735 as described with reference to FIG. 17.

At 2615, the method may include selecting, from a set of multiple candidate transmit channel shorteners, the transmit channel shortener to apply to a set of subcarriers of a channel, the channel energy associated with the transmit channel shortener being greater than a respective channel energy associated with each of one or more other transmit channel shorteners of the set of multiple candidate transmit channel shorteners. The operations of block 2615 may be performed in accordance with examples as disclosed herein. In some examples, aspects of the operations of 2615 may be performed by a channel shortener component 1725 as described with reference to FIG. 17.

At 2620, the method may include transmitting a signal in accordance with the selected transmit channel shortener via the set of subcarriers of the channel. The operations of block 2620 may be performed in accordance with examples as disclosed herein. In some examples, aspects of the operations of 2620 may be performed by a channel component 1730 as described with reference to FIG. 17.

The following provides an overview of aspects of the present disclosure:

Aspect 1: A method for wireless communication by a UE, comprising: precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps; and transmitting the signal in accordance with the precoding via the set of subcarriers.

Aspect 2: The method of aspect 1, further comprising: selecting one or more scaling factors associated with a power normalization of the set of subcarriers, the one or more scaling factors being associated with the subset of time domain precoding taps; and performing the power normalization of the set of subcarriers in accordance with the one or more scaling factors.

Aspect 3: The method of any of aspects 1 through 2, wherein precoding the signal comprises: precoding the signal using a precoding matrix that is associated with the subset of time domain precoding taps.

Aspect 4: The method of aspect 3, further comprising: receiving one or more downlink reference signals; and generating the precoding matrix in accordance with channel information of an uplink channel that is associated with the one or more downlink reference signals, the channel information of the uplink channel being associated with measurements of the one or more downlink reference signals.

Aspect 5: The method of any of aspects 1 through 4, wherein the signal comprises an SRS, the method further comprising: selecting a second subset of time domain precoding taps from the set of time domain precoding taps in association with transmitting the SRS.

Aspect 6: The method of any of aspects 1 through 5, further comprising: receiving an indication of a precoding matrix associated with the set of time domain precoding taps; and selecting a subset of the precoding matrix associated with the subset of time domain precoding taps, the precoding of the signal being in accordance with the selected subset of the precoding matrix.

Aspect 7: The method of aspect 6, wherein receiving the indication of the precoding matrix comprises: receiving control signaling that indicates the precoding matrix.

Aspect 8: The method of any of aspects 1 through 7, wherein the signal comprises a CSI report in accordance with an enhanced Type 2 CSI codebook.

Aspect 9: A method for wireless communication by a network entity, comprising: precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps; and transmitting the signal via the set of subcarriers in accordance with the precoding.

Aspect 10: The method of aspect 9, further comprising: selecting one or more scaling factors associated with a power normalization of the set of subcarriers, the one or more scaling factors being associated with the subset of time domain precoding taps; and performing the power normalization of the set of subcarriers in accordance with the one or more scaling factors.

Aspect 11: The method of any of aspects 9 through 10, wherein precoding the signal comprises: precoding the signal in accordance with a precoding matrix that is associated with the subset of time domain precoding taps.

Aspect 12: The method of any of aspects 9 through 11, further comprising: receiving an indication of a precoding matrix associated with the set of time domain precoding taps; and selecting a subset of the precoding matrix associated with the subset of time domain precoding taps, the precoding of the signal being in accordance with the subset of the precoding matrix.

Aspect 13: The method of aspect 12, wherein transmitting the indication of the precoding matrix comprises: receiving a CSI report that indicates the precoding matrix.

Aspect 14: The method of aspect 13, wherein the CSI report comprises an enhanced Type-2 CSI codebook that indicates the precoding matrix.

Aspect 15: A method for wireless communication by a transmitter, comprising: selecting, from a plurality of candidate transmit channel shorteners, a transmit channel shortener to apply to a set of subcarriers of a channel, a channel energy associated with the transmit channel shortener being greater than a respective channel energy associated with each of one or more other transmit channel shorteners of the plurality of candidate transmit channel shorteners; and transmitting a signal in accordance with the selected transmit channel shortener via the set of subcarriers of the channel.

Aspect 16: The method of aspect 15, wherein transmitting the signal comprises: transmitting the signal via a second channel, the second channel comprising the channel and the transmit channel shortener.

Aspect 17: The method of aspect 16, wherein a length of the second channel is shorter than a length of the channel in accordance with the transmit channel shortener.

Aspect 18: The method of any of aspects 16 through 17, wherein transmitting signal via the second channel comprises: performing a convolution of the selected transmit channel shortener with a channel matrix in a time domain, the channel matrix corresponding to a set of time domain channel taps associated with the set of subcarriers.

Aspect 19: The method of any of aspects 15 through 18, wherein selecting the transmit channel shortener further comprises: generating a diagonal matrix that is indicative of a time delay and a target window length of a target window associated with the selected transmit channel shortener.

Aspect 20: The method of aspect 19, wherein selecting the transmit channel shortener further comprises: calculating the channel energy associated with the transmit channel shortener in accordance with the diagonal matrix.

Aspect 21: The method of any of aspects 15 through 20, further comprising: precoding the signal in accordance with a CSI report that comprises an enhanced Type-2 CSI codebook.

Aspect 22: A UE for wireless communication, comprising a processing system that includes processor circuitry and memory circuitry that stores code, the processing system configured to cause the UE to perform a method of any of aspects 1 through 8.

Aspect 23: A UE for wireless communication, comprising at least one means for performing a method of any of aspects 1 through 8.

Aspect 24: A non-transitory computer-readable medium storing code for wireless communication, the code comprising instructions executable by one or more processors to perform a method of any of aspects 1 through 8.

Aspect 25: A network entity for wireless communication, comprising a processing system that includes processor circuitry and memory circuitry that stores code, the processing system configured to cause the network entity to perform a method of any of aspects 9 through 14.

Aspect 26: A network entity for wireless communication, comprising at least one means for performing a method of any of aspects 9 through 14.

Aspect 27: A non-transitory computer-readable medium storing code for wireless communication, the code comprising instructions executable by one or more processor to perform a method of any of aspects 9 through 14.

Aspect 28: A transmitter for wireless communication, comprising a processing system that includes processor circuitry and memory circuitry that stores code, the processing system configured to cause the transmitter to perform a method of any of aspects 15 through 21.

Aspect 29: A transmitter for wireless communication, comprising at least one means for performing a method of any of aspects 15 through 21.

Aspect 30: A non-transitory computer-readable medium storing code for wireless communication, the code comprising instructions executable by one or more processors to perform a method of any of aspects 15 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (for example, receiving information), accessing (for example, accessing data stored in memory) and the like. Also, "determining" can include resolving, obtaining, selecting, choosing, establishing, and other such similar actions.

In the appended Figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

a processing system that includes processor circuitry and memory circuitry that stores code, the processing system configured to cause the UE to:

precode a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps; and transmit the signal via the set of subcarriers in accordance with the precoding.

2. The UE of claim 1, wherein the processing system is further configured to cause the UE to:

select one or more scaling factors associated with a power normalization of the set of subcarriers, the one or more scaling factors being associated with the subset of time domain precoding taps; and perform the power normalization of the set of subcarriers in accordance with the one or more scaling factors.

3. The UE of claim 1, wherein, to precode the signal, the processing system is configured to cause the UE to precode the signal using a precoding matrix that is associated with the subset of time domain precoding taps.

4. The UE of claim 3, wherein the processing system is further configured to cause the UE to:

receive one or more downlink reference signals; and generate the precoding matrix in accordance with channel information of an uplink channel that is associated with the one or more downlink reference signals, the channel information of the uplink channel being associated with measurements of the one or more downlink reference signals.

5. The UE of claim 1, wherein the signal comprises a sounding reference signal, and the processing system is further configured to cause the UE to select a second subset of time domain precoding taps from the set of time domain precoding taps in association with transmitting the sounding reference signal.

6. The UE of claim 1, wherein the processing system is further configured to cause the UE to:

receive an indication of a precoding matrix associated with the set of time domain precoding taps; and select a subset of the precoding matrix associated with the subset of time domain precoding taps, the precoding of the signal being in accordance with the selected subset of the precoding matrix.

7. The UE of claim 6, wherein, to receive the indication of the precoding matrix, the processing system is configured to cause the UE to receive control signaling that indicates the precoding matrix.

8. The UE of claim 1, wherein the signal comprises a channel state information report in accordance with an enhanced Type-2 channel state information codebook.

9. A network entity, comprising:

a processing system that includes processor circuitry and memory circuitry that stores code, the processing system configured to cause the network entity to:

precode a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps; and transmit the signal in accordance with the precoding via the set of subcarriers.

10. The network entity of claim 9, wherein the processing system is further configured to cause the network entity to:

select one or more scaling factors associated with a power normalization of the set of subcarriers, the one or more scaling factors being associated with the subset of time domain precoding taps; and perform the power normalization of the set of subcarriers in accordance with the one or more scaling factors.

11. The network entity of claim 9, wherein, to precode the signal, the processing system is configured to cause the network entity to precode the signal in accordance with a precoding matrix that is associated with the subset of time domain precoding taps.

12. The network entity of claim 9, wherein the processing system is further configured to cause the network entity to:

receive an indication of a precoding matrix associated with the set of time domain precoding taps; and select a subset of the precoding matrix associated with the subset of time domain precoding taps, the precoding of the signal being in accordance with the subset of the precoding matrix.

13. The network entity of claim 12, wherein, to receive the indication of the precoding matrix, the processing system is configured to cause the network entity to receive a channel state information report that indicates the precoding matrix.

14. The network entity of claim 13, wherein the channel state information report comprises an enhanced Type-2 channel state information codebook that indicates the precoding matrix.

15. A method for wireless communication by a user equipment (UE), comprising:

precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps; and transmitting the signal in accordance with the precoding via the set of subcarriers.

16. The method of claim 15, further comprising:

selecting one or more scaling factors associated with a power normalization of the set of subcarriers, the one or more scaling factors being associated with the subset of time domain precoding taps; and performing the power normalization of the set of subcarriers in accordance with the one or more scaling factors.

17. The method of claim 15, wherein precoding the signal comprises precoding the signal using a precoding matrix that is associated with the subset of time domain precoding taps.

18. The method of claim 17, further comprising:
receiving one or more downlink reference signals; and
generating the precoding matrix in accordance with channel information of an uplink channel that is associated with the one or more downlink reference signals, the channel information of the uplink channel being associated with measurements of the one or more downlink reference signals.

19. The method of claim 15, wherein the signal comprises a sounding reference signal, the method further comprising:
selecting a second subset of time domain precoding taps from the set of time domain precoding taps in association with transmitting the sounding reference signal.

20. The method of claim 15, further comprising:
receiving an indication of a precoding matrix associated with the set of time domain precoding taps; and
selecting a subset of the precoding matrix associated with the subset of time domain precoding taps, the precoding of the signal being in accordance with the selected subset of the precoding matrix.

21. The method of claim 20, wherein receiving the indication of the precoding matrix comprises receiving control signaling that indicates the precoding matrix.

22. The method of claim 15, wherein the signal comprises a channel state information report.

23. The method of claim 22, wherein the channel state information report is in accordance with an enhanced Type-2 channel state information codebook.

24. A method for wireless communication by a network entity, comprising:
precoding a signal in accordance with a subset of time domain precoding taps from a set of time domain precoding taps, each of the set of time domain precoding taps corresponding to a respective precoding value of a set of precoding values associated with a set of subcarriers, and a respective absolute value of each of the subset of time domain precoding taps being greater than a respective absolute value of each of one or more other time domain precoding taps of the set of time domain precoding taps; and
transmitting the signal in accordance with the precoding via the set of subcarriers.

25. The method of claim 24, further comprising:
selecting one or more scaling factors associated with a power normalization of the set of subcarriers, the one or more scaling factors being associated with the subset of time domain precoding taps; and
performing the power normalization of the set of subcarriers in accordance with the one or more scaling factors.

26. The method of claim 24, wherein precoding the signal comprises precoding the signal in accordance with a precoding matrix that is associated with the subset of time domain precoding taps.

27. The network entity of claim 24, further comprising:
receiving an indication of a precoding matrix associated with the set of time domain precoding taps; and
selecting a subset of the precoding matrix associated with the subset of time domain precoding taps, the precoding of the signal being in accordance with the subset of the precoding matrix.

28. The network entity of claim 27, wherein receiving the indication of the precoding matrix comprises receiving a channel state information report that indicates the precoding matrix.

29. The network entity of claim 28, wherein the channel state information report comprises an enhanced Type-2 channel state information codebook that indicates the precoding matrix.

* * * * *